(12) United States Patent
Lee et al.

(10) Patent No.: US 12,342,393 B2
(45) Date of Patent: Jun. 24, 2025

(54) METHOD AND DEVICE FOR CONNECTING DEVICES BY MEANS OF BLUETOOTH AND IN-BAND COMMUNICATION IN WIRELESS POWER TRANSMISSION SYSTEM

(71) Applicant: LG ELECTRONICS INC., Seoul (KR)

(72) Inventors: Minsoo Lee, Seoul (KR); Yongcheol Park, Seoul (KR); Taewook Kwon, Seoul (KR); Gyunghwan Yook, Seoul (KR); Jinho Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 18/263,635

(22) PCT Filed: Jan. 28, 2022

(86) PCT No.: PCT/KR2022/001629
§ 371 (c)(1),
(2) Date: Jul. 31, 2023

(87) PCT Pub. No.: WO2022/164271
PCT Pub. Date: Aug. 4, 2022

(65) Prior Publication Data
US 2024/0314854 A1    Sep. 19, 2024

(30) Foreign Application Priority Data
Feb. 1, 2021 (KR) .................. 10-2021-0014305

(51) Int. Cl.
*H04W 76/10* (2018.01)
*H02J 50/12* (2016.01)
*H02J 50/80* (2016.01)

(52) U.S. Cl.
CPC ............. *H04W 76/10* (2018.02); *H02J 50/12* (2016.02); *H02J 50/80* (2016.02)

(58) Field of Classification Search
CPC ......... H04W 76/10; H04W 4/80; H02J 50/12; H02J 50/80; H02J 50/90; H04L 69/24
See application file for complete search history.

(56) References Cited

U.S. PATENT DOCUMENTS

2018/0352312 A1* 12/2018 Kwon .................... H04W 8/005
2019/0312469 A1* 10/2019 Shichino ................ H04W 76/14
2020/0367031 A1* 11/2020 Fujita ..................... H04W 8/00

* cited by examiner

*Primary Examiner* — Jeffrey M Shin
(74) *Attorney, Agent, or Firm* — LEE, HONG, DEGERMAN, KANG & WAIMEY

(57) ABSTRACT

The present specification provides a method for transmitting an address relating to out-band communication performed by a wireless power receiver in a wireless power transmission system, and a device using same, the method characterized by: transmitting to a wireless power transmitter the address relating to the out-band communication of the wireless power receiver, by means of in-band communication established with the wireless power transmitter; exchanging information relating to scan with the wireless power transmitter prior to the establishment of the out-band communication; and establishing the out-band communication on the basis of the address relating to the out-band communication and the information relating to the scan, wherein the information relating to the scan comprises additional information relating to the wireless power receiver.

15 Claims, 26 Drawing Sheets

|  | b7 | b6 | b5 | b4 | b3 | b2 | b1 | b0 |
|---|---|---|---|---|---|---|---|---|
| Byte 0 | Application Profile ||||||||
| Byte 1 | Version ||||||||
| Byte 2-N-1 | Profile-specific data ||||||||

|  | $b_7$ | $b_6$ | $b_5$ | $b_4$ | $b_3$ | $b_2$ | $b_1$ | $b_0$ |
|---|---|---|---|---|---|---|---|---|
| $B_0$ | '00' | | Reference Power | | | | | |
| $B_1$ | Reserved | | | | | | | |
| $B_2$ | ZERO | AI | Reserved | OB | ZERO | Count | | |
| $B_3$ | Window Size | | | | Window Offset | | | |
| $B_4$ | Neg | Pol | Depth | | Buffer Size | | | Dup |

|       | $b_7$ | $b_6$ | $b_5$ | $b_4$ | $b_3$ | $b_2$ | $b_1$ | $b_0$ |
|-------|-------|-------|-------|-------|-------|-------|-------|-------|
| $B_0$ | Reserved | | Negotiable Load Power | | | | | |
| $B_1$ | Reserved | | Potential Load Power | | | | | |
| $B_2$ | Dup | AR | OB | Buffer Size | | | WPID | NRS |

METHOD AND DEVICE FOR CONNECTING DEVICES BY MEANS OF BLUETOOTH AND IN-BAND COMMUNICATION IN WIRELESS POWER TRANSMISSION SYSTEM

CROSS-REFERENCE TO RELATED APPLICATIONS

This application is the National Stage filing under 35 U.S.C. 371 of International Application No. PCT/KR2022/001629, filed on Jan. 28, 2022, which claims the benefit of earlier filing date and right of priority to Korean Application No. 10-2021-0014305, filed on Feb. 1, 2021, the contents of which are all hereby incorporated by reference herein in their entireties.

TECHNICAL FIELD

This specification relates to wireless power transfer.

BACKGROUND

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones. 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

Meanwhile, in wireless charging, it is intended to provide a technique for preventing cross-connection.

SUMMARY

According to one embodiment of the present specification, a method and apparatus for transmitting an address related to the out-band communication of the wireless power receiver to the wireless power transmitter through in-band communication established with the wireless power transmitter, exchanging information related to scan with the wireless power transmitter before the out-band communication is established and establishing the out-band communication based on an address related to the out-band communication and information related to the scan, where the information related to the scan includes additional information about the wireless power receiver, may be provided.

According to the present specification, since the wireless power transmitter can establish a BLE connection with the wireless power receiver for which an in-band connection has been established, cross-connection issues can be prevented.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

MODE

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDDCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
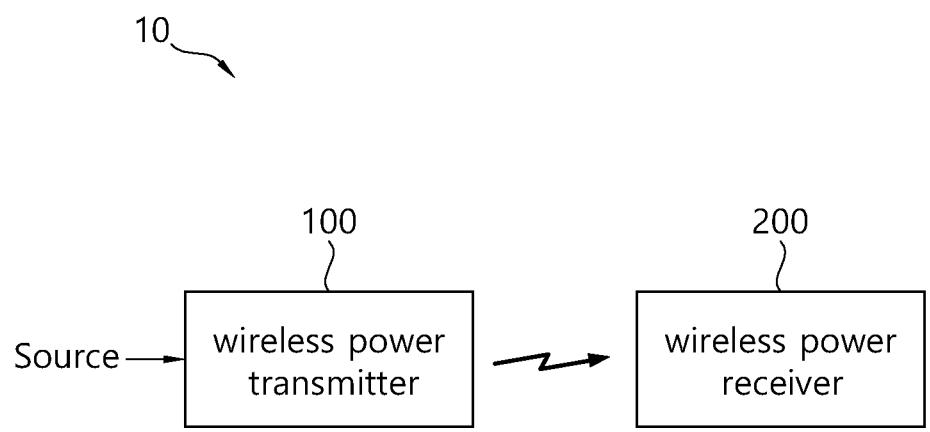
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
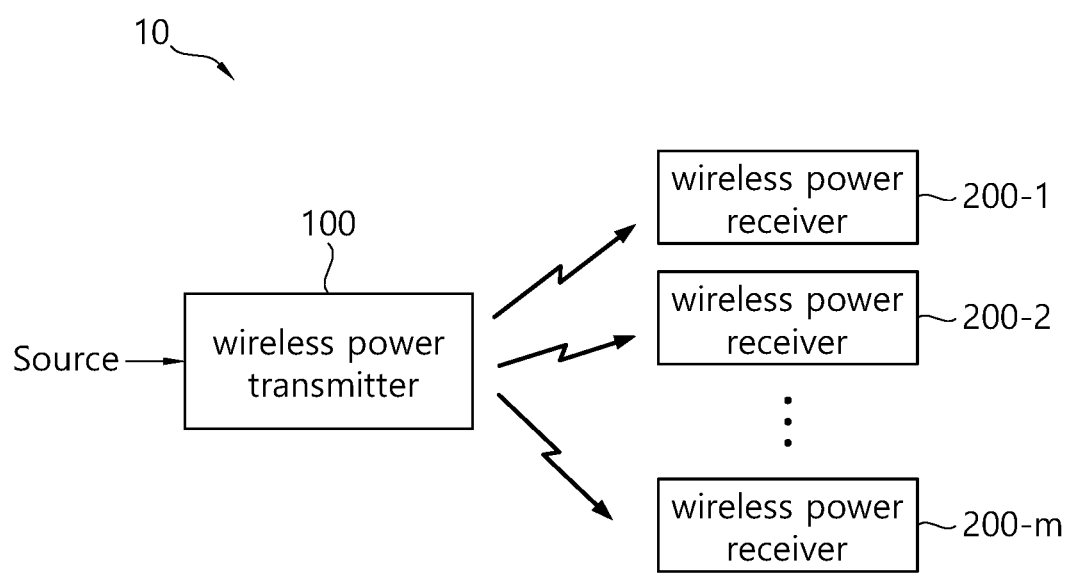
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figures 3, 4:
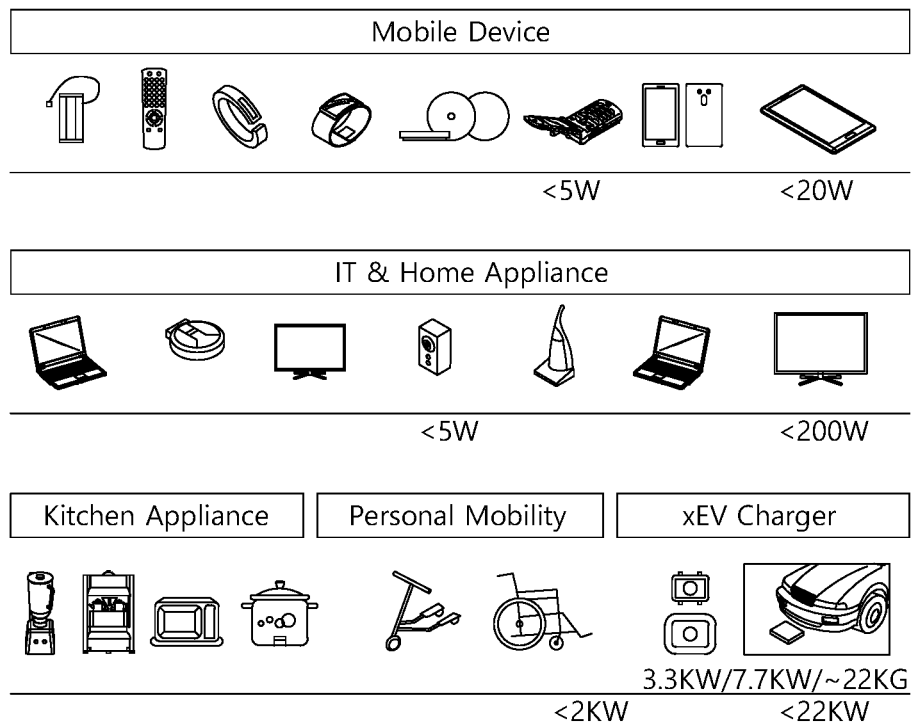
FIG. 3 shows an exemplary embodiment of diverse electronic devices adopting a wireless power transfer system.
FIG. 4 shows an example of a WPC NDEF in a wireless power transfer system.

FIG. 3 shows an exemplary embodiment of diverse electronic devices adopting a wireless power transfer system.

As shown in FIG. 3, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 KW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

Hereinafter, "profiles" will be newly defined based on indexes/reference standards representing/indicating the compatibility. More specifically, it may be understood that by maintaining compatibility between wireless power transmitters and receivers having the same "profile", stable power transfer/reception may be performed, and that power transfer/reception between wireless power transmitters and receivers having different profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 4 shows an example of a WPC NDEF in a wireless power transfer system.

Referring to FIG. 4, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment. In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

Figure 5:
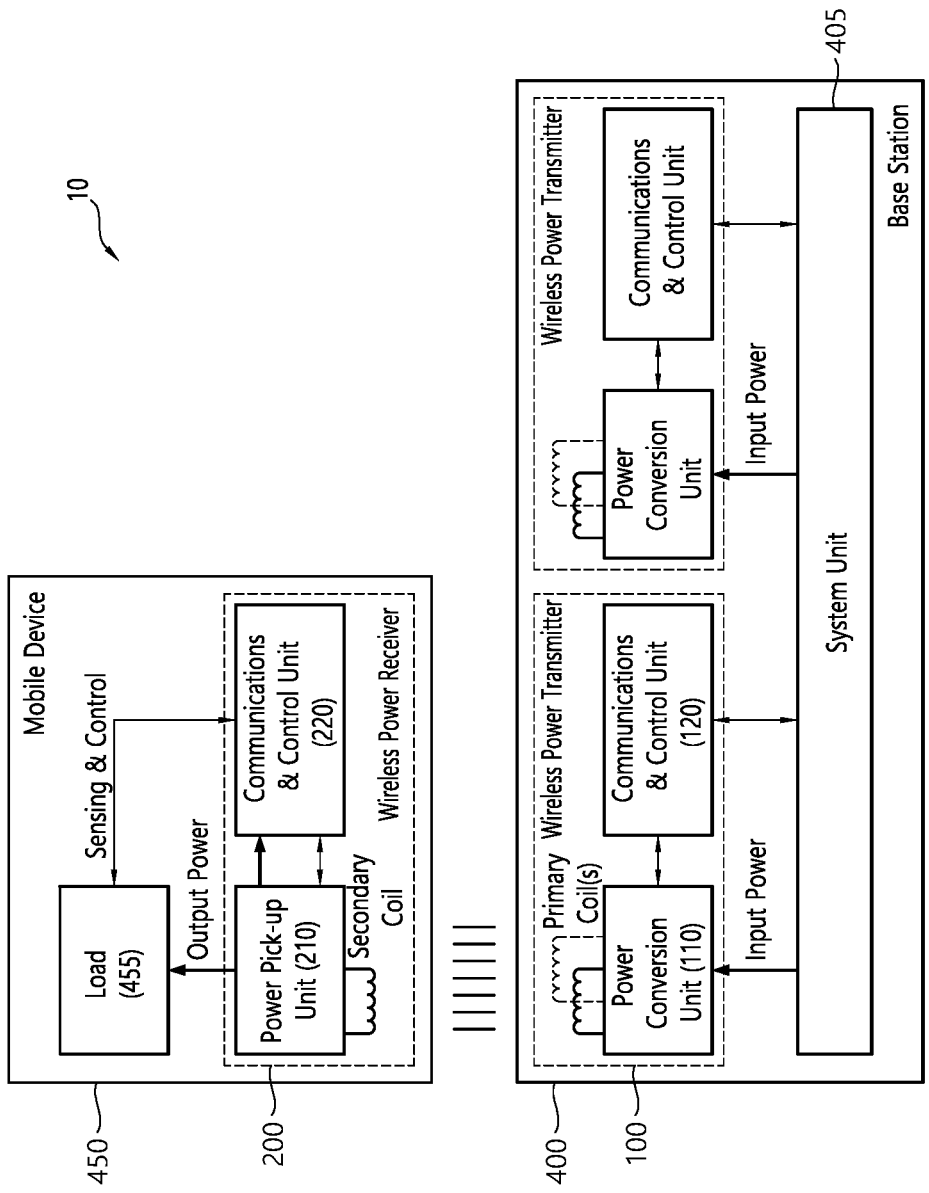
FIG. 5 is a block diagram of a wireless power transfer system according to another exemplary embodiment of the present disclosure.

As shown in Table 1, a maximum output power capability of Class n PTU may be equal to or greater than the $P_{TX\_IN\_MAX}$ of the corresponding class. The PRU cannot draw a power that is higher than the power level specified in the corresponding category. FIG. 5 is a block diagram of a wireless power transfer system according to another exemplary embodiment of the present disclosure.

Referring to FIG. 5, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 5, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220)) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 6:
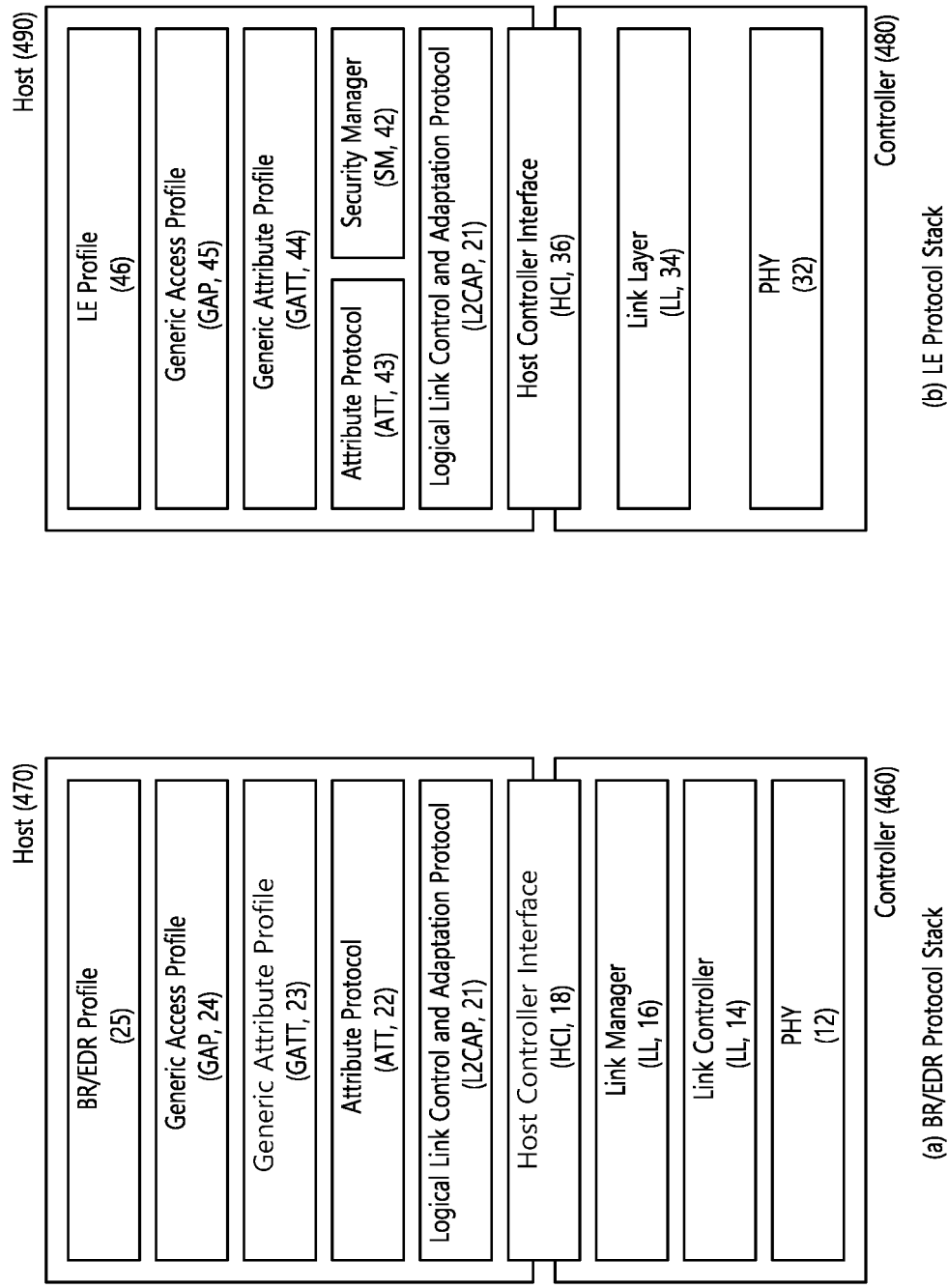
FIG. 6 is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 6.

FIG. 6 is a diagram illustrating an example of a Bluetooth communication architecture to which an embodiment according to the present disclosure may be applied.

Referring to FIG. 6, (a) of FIG. 6 shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 6, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.
  Performs ACL/SCO logical transport, logical link setup, and control.
  Detach: It interrupts connection and informs a counterpart device about a reason for the interruption.
  Performs power control and role switch.
  Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 6, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window; the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU The following advertising channel PDU types are termed advertising PDUs and used in a specific event.
- ADV_IND: Connectable undirected advertising event
- ADV_DIRECT_IND: Connectable directed advertising event
- ADV_NONCONN_IND: Unconnectable undirected advertising event
- ADV_SCAN_IND: Scannable undirected advertising event The PDUs are transmitted from the LL in an advertising state, and received by the LL in a scanning state or in an initiating state.

Scanning PDU

The following advertising channel DPU types are termed scanning PDUs and are used in a state described hereinafter.
- SCAN_REQ: Transmitted by the LL in a scanning state and received by the LL in an advertising state.
- SCAN_RSP: Transmitted by the LL in the advertising state and received by the LL in the scanning state.

Initiating PDU

The following advertising channel PDU type is termed an initiating PDU.
- CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 5, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 7:
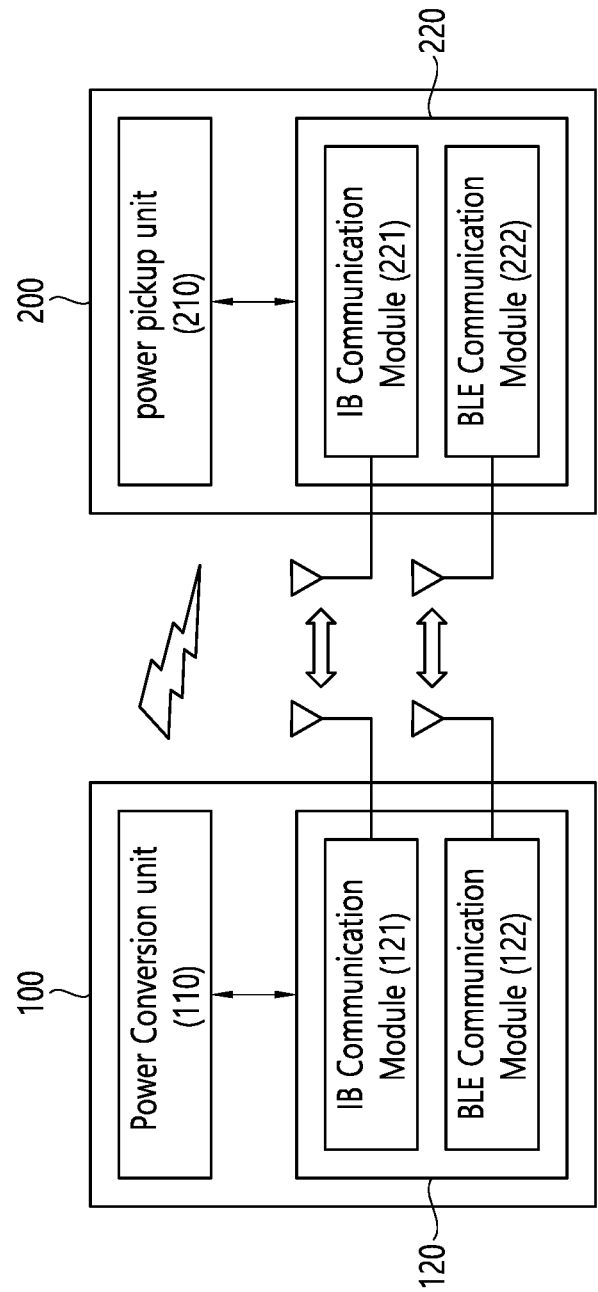
FIG. 7 is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 7.

FIG. 7 is a block diagram illustrating a wireless power transfer system using BLE communication according to an example.

Referring to FIG. 7, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 6. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 8:
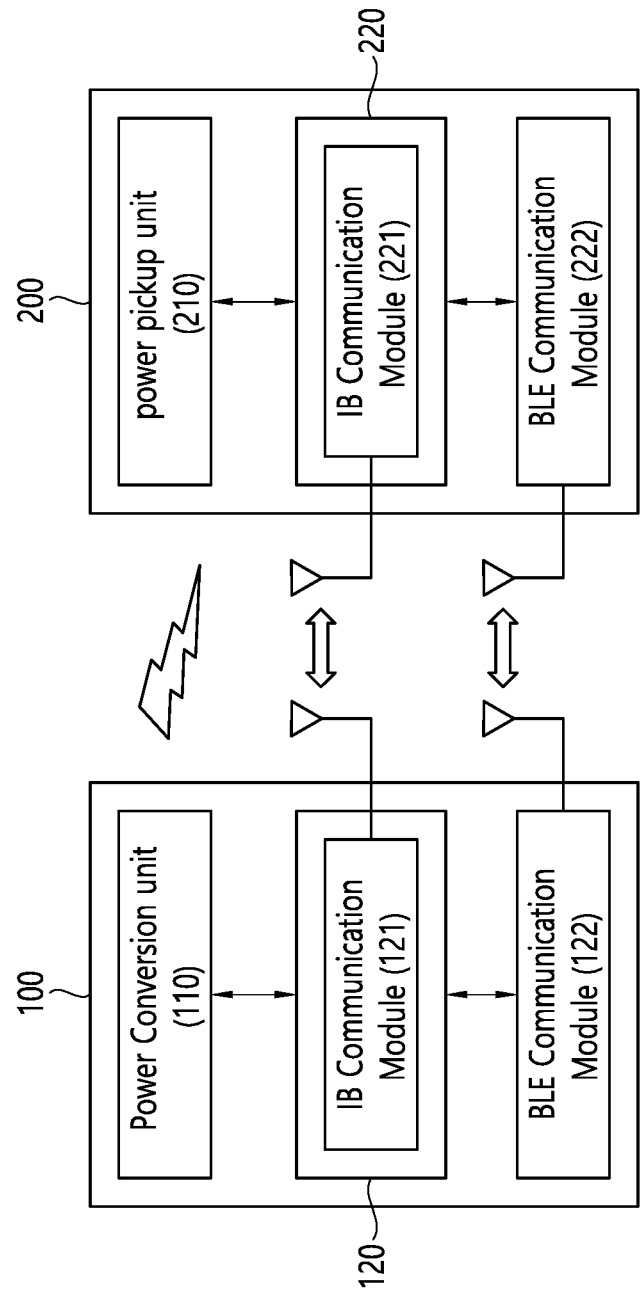
FIG. 8 is a block diagram illustrating a wireless power transfer system using BLE communication according to another example.

FIG. 8 is a block diagram illustrating a wireless power transfer system using BLE communication according to another example.

Referring to FIG. 8, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 9:
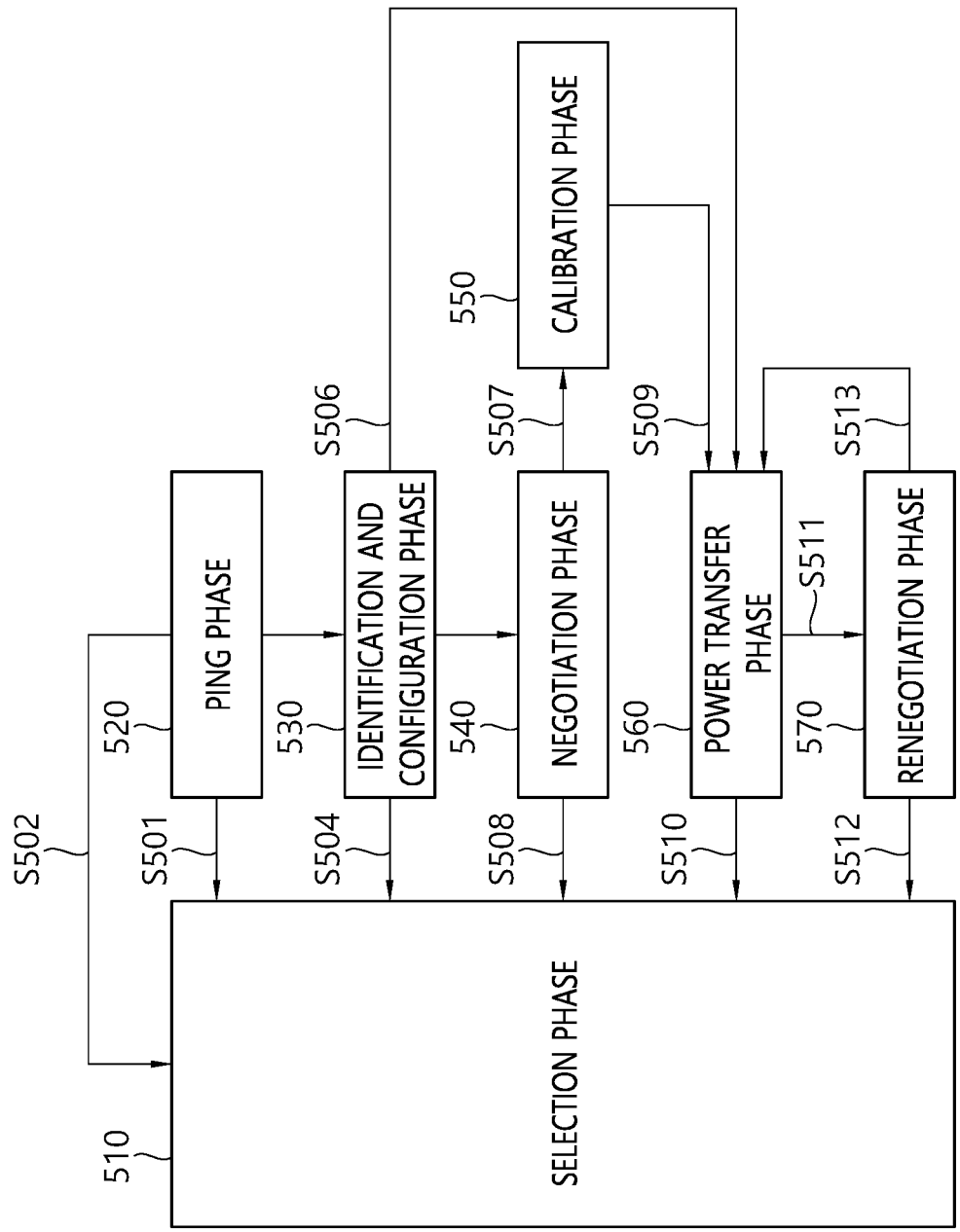
FIG. 9 is a state transition diagram for describing a wireless power transfer procedure.

FIG. 9 is a state transition diagram for describing a wireless power transfer procedure.

Referring to FIG. 9, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570)).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520)), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550)) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 10:
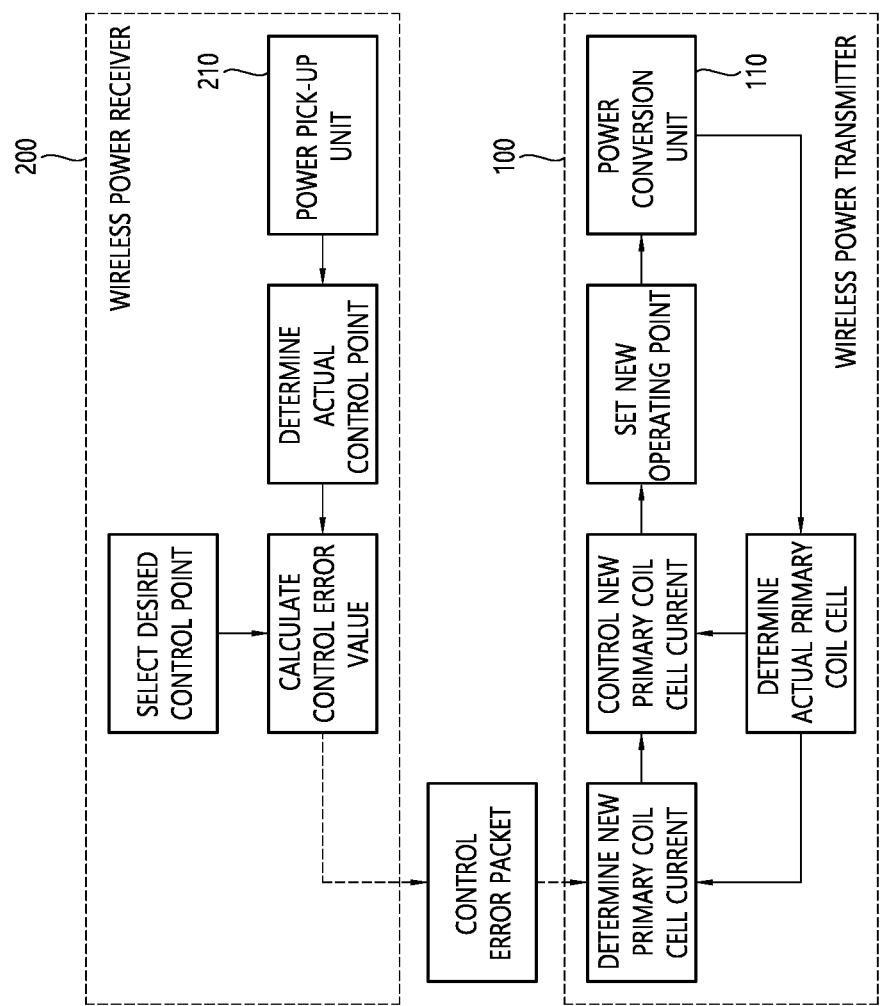
FIG. 10 shows a power control method according to an exemplary embodiment of the present disclosure.

FIG. 10 shows a power control method according to an exemplary embodiment of the present disclosure.

As shown in FIG. 10, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 10 will not be completely excluded. And, additional control of the transmitted power may be performed by using the method of FIG. 10.

Figure 11:
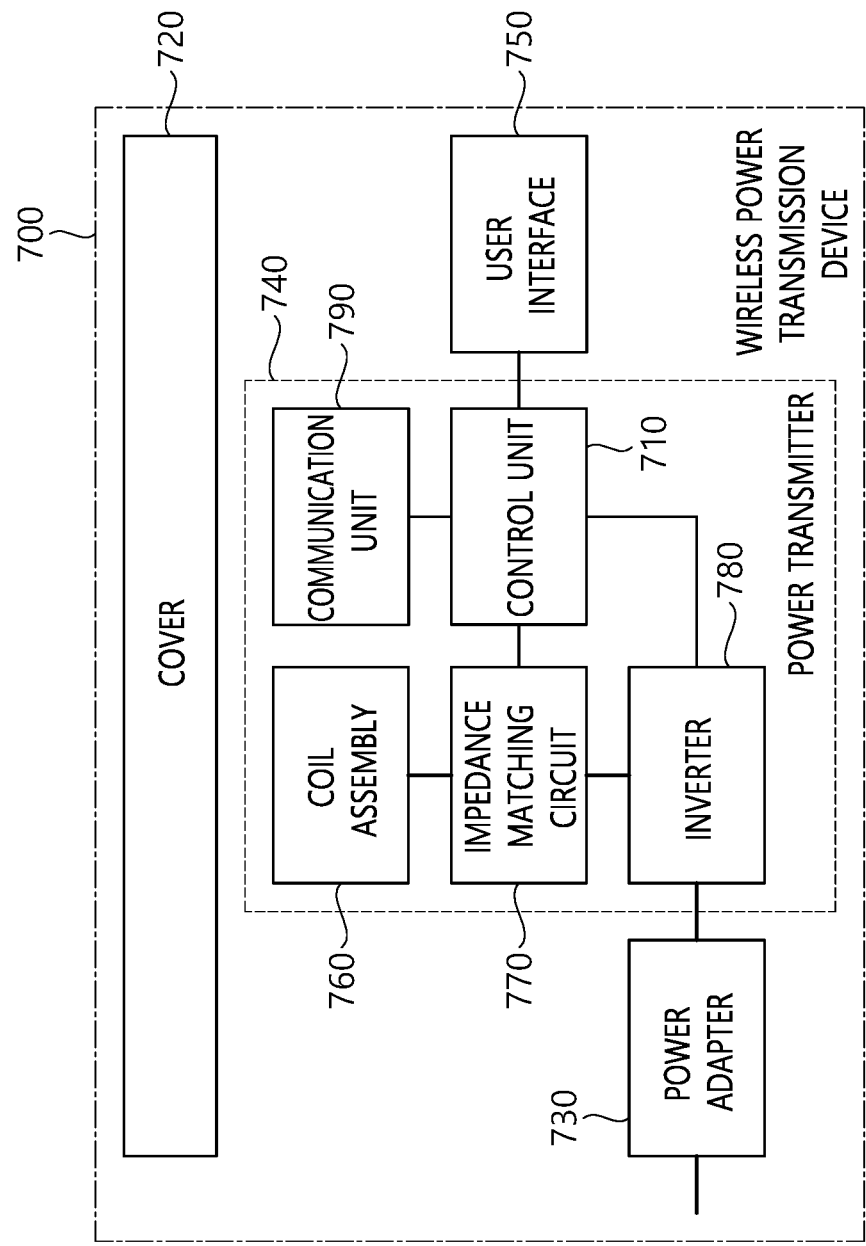
FIG. 11 is a block diagram of a wireless power transmitter according to another exemplary embodiment of the present disclosure.

FIG. 11 is a block diagram of a wireless power transmitter according to another exemplary embodiment of the present disclosure.

This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 11, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770)) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 12:
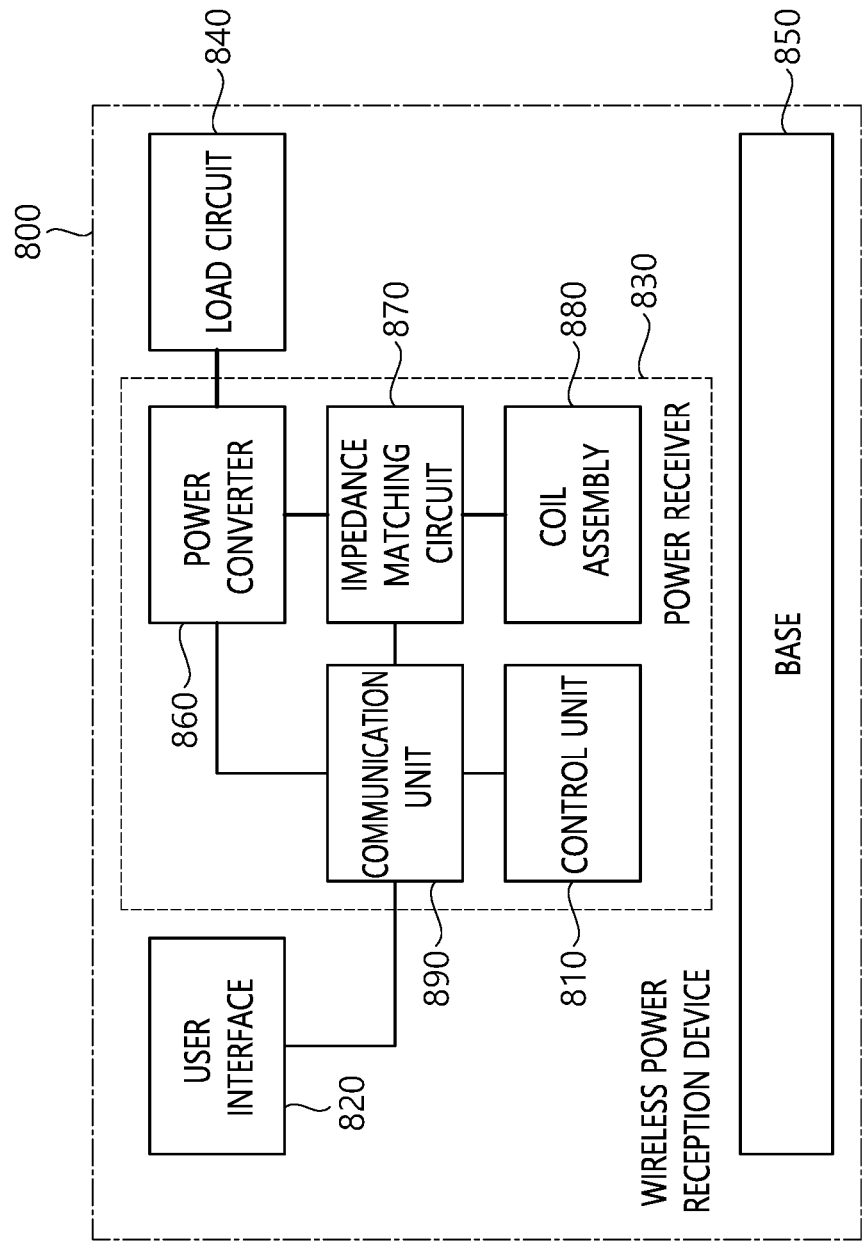
FIG. 12 shows a wireless power receiver according to another exemplary embodiment of the present disclosure.

FIG. 12 shows a wireless power receiver according to another exemplary embodiment of the present disclosure.

This may belong to a wireless power transfer system that is being operated in the magnetic resonance mode or the shared mode.

Referring to FIG. 12, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870)), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870)) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

As described in FIG. 9 etc., the wireless power transmitter and the wireless power receiver go through a Ping Phase and a Configuration Phase to enter the Negotiation Phase, or may go through a ping phase, a configuration phase, and a negotiation phase to enter a power transfer phase and then to a re-negotiation phase.

Figure 13:
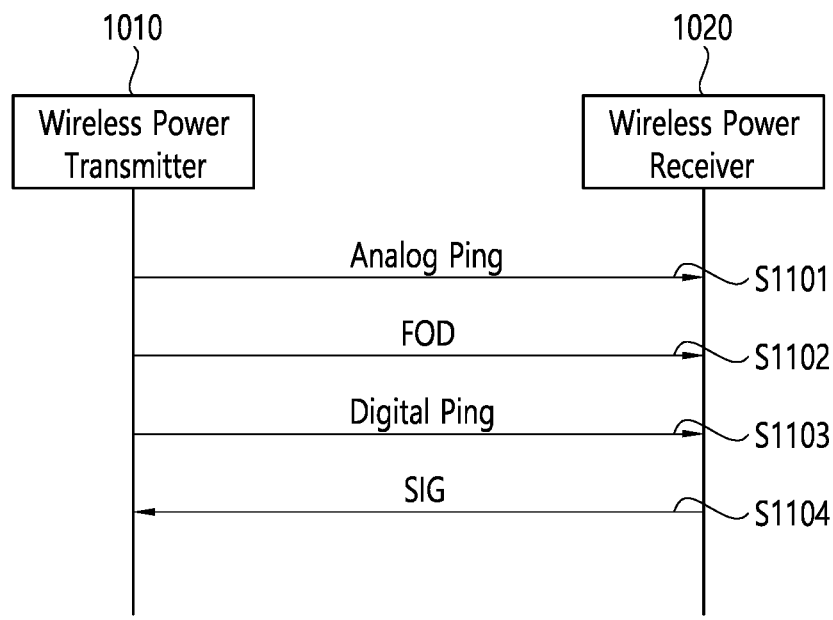
FIG. 13 is a flowchart schematically illustrating a protocol of a ping phase according to an embodiment.

FIG. 13 is a flowchart schematically illustrating a protocol of a ping phase according to an embodiment.

Referring to FIG. 13, in the ping phase, the wireless power transmitter 1010 checks whether an object exists in an operating volume by transmitting an analog ping (S1101). The wireless power transmitter 1010 may detect whether an object exists in the working space based on a change in current of a transmission coil or a primary coil.

If it is determined that an object exists in the operating volume by analog ping, the wireless power transmitter 1010 may perform foreign object detection (FOD) before power transmission to check whether a foreign object exists in the operating volume (S1102). The wireless power transmitter 1010 may perform an operation for protecting the NFC card and/or the RFID tag.

Thereafter, the wireless power transmitter 1010 identifies the wireless power receiver 1020 by transmitting a digital ping (S1103). The wireless power receiver 1020 recognizes the wireless power transmitter 1010 by receiving the digital ping.

The wireless power receiver 1020 that has received the digital ping transmits a signal strength data packet (SIG) to the wireless power transmitter 1010 (S1104).

The wireless power transmitter 1010 receiving the SIG from the wireless power receiver 1020 may identify that the wireless power receiver 1020 is located in the operating volume.

Figure 14:
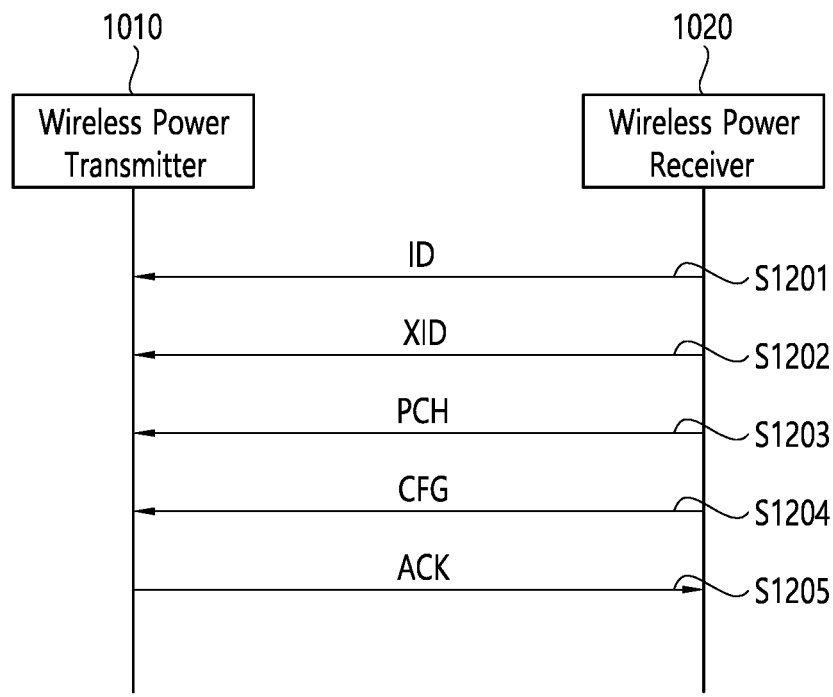
FIG. 14 is a flowchart schematically illustrating a protocol of a configuration phase according to an embodiment.

FIG. 14 is a flowchart schematically illustrating a protocol of a configuration phase according to an embodiment.

In the configuration phase (or identification and configuration phase), the wireless power receiver 1020 transmits its identification information to the wireless power transmitter 1010, the wireless power receiver 1020 and the wireless power transmitter 1010 may establish a baseline Power Transfer Contract.

Referring to FIG. 14, in the configuration phase, the wireless power receiver 1020 may transmit an identification data packet (ID) to the wireless power transmitter 1010 to identify itself (S1201). In addition, the wireless power receiver 1020 may transmit an XID (Extended Identification data packet) to the wireless power transmitter 1010 (S1202). In addition, the wireless power receiver 1020 may transmit a power control hold-off data packet (PCH) to the wireless power transmitter 1010 for a power transfer contract (S1203). In addition, the wireless power receiver 1020 may transmit a configuration data packet (CFG) to the wireless power transmitter (S1204).

In accordance with the Extended Protocol for EPP, the wireless power transmitter 1010 may transmit an ACK in response to the CFG (S1205).

Figures 15, 16:
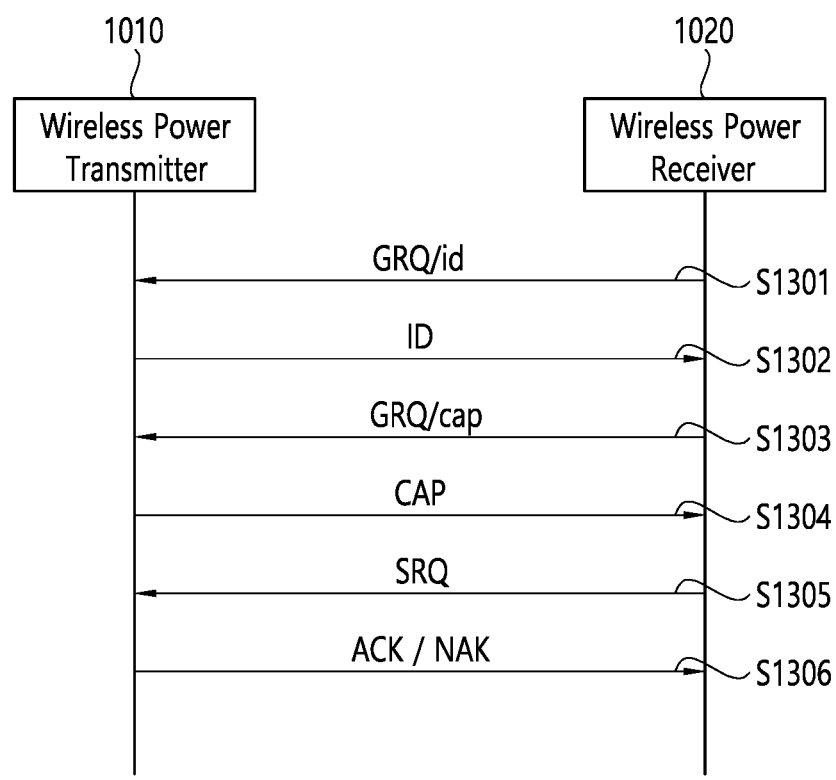
FIG. 15 is a diagram illustrating a message field of a configuration packet (CFG) of a wireless power receiver according to an embodiment.
FIG. 16 is a flowchart schematically illustrating a protocol of a negotiation step or a renegotiation step according to an embodiment.

FIG. 15 is a diagram illustrating a message field of a configuration packet (CFG) of a wireless power receiver according to an embodiment.

A configuration packet (CFG) according to an embodiment may have a header value of 0x51 and may include a message field of 5 bytes, referring to FIG. 15.

Referring to FIG. 15, the message field of the configuration packet CFG may include a 1-bit authentication (AI) flag, and a 1-bit out-of-band (OB) flag.

The authentication flag AI indicates whether the wireless power receiver 1020 supports the authentication function. For example, if the value of the authentication flag AI is '1', it indicates that the wireless power receiver 1020 supports an authentication function or operates as an authentication initiator, if the value of the authentication flag AI is '0', it may indicate that the wireless power receiver 1020 does not support an authentication function or cannot operate as an authentication initiator.

The out-band (OB) flag indicates whether the wireless power receiver 1020 supports out-band communication. For example, if the value of the out-band (OB) flag is '1', the wireless power receiver 1020 instructs out-band communication, if the value of the out-band (OB) flag is '0', it may indicate that the wireless power receiver 1020 does not support out-band communication.

In the configuration phase, the wireless power transmitter 1010 may receive the configuration packet (CFG) of the wireless power receiver 1020 and check whether the wireless power receiver 1020 supports an authentication function and supports out-of-band communication.

FIG. 16 is a flowchart schematically illustrating a protocol of a negotiation step or a renegotiation step according to an embodiment.

In the negotiation phase or renegotiation phase, the power transfer contract related to the reception/transmission of wireless power between the wireless power receiver and the wireless power transmitter is expanded or changed, or a renewal of the power transfer contract is made that adjusts at least some of the elements of the power transfer contract, or exchange of information for establishing out-band communication may be performed.

Referring to FIG. 16, in the negotiation phase, the wireless power receiver 1020 may receive an identification data packet (ID) and a capabilities data packet (CAP) of the wireless power transmitter 1010 using a general request data packet (GRQ).

The general request packet (GRQ) may have a header value of 0x07 and may include a 1-byte message field. The message field of the general request packet (GRQ) may include a header value of a data packet that the wireless power receiver 1020 requests from the wireless power transmitter 1010 using the GRQ packet. For example, when the wireless power receiver 1020 requests an ID packet of the wireless power transmitter 1010 using a GRQ packet, the wireless power receiver 1020 transmits a general request packet (GRQ/id) including a header value (0x30) of the ID packet of the wireless power transmitter 1010 in the message field of the general request packet (GRQ).

Referring to FIG. 16, in the negotiation phase or renegotiation phase, the wireless power receiver 1020 may transmit a GRQ packet (GRQ/id) requesting the ID packet of the wireless power transmitter 1010 to the wireless power transmitter 1010 (S1301).

The wireless power transmitter 1010 receiving the GRQ/id may transmit the ID packet to the wireless power receiver 1020 (S1302). The ID packet of the wireless power transmitter 1010 includes information on the Manufacturer Code.

The ID packet including information on the Manufacturer Code allows the manufacturer of the wireless power transmitter 1010 to be identified.

Referring to FIG. 16, in the negotiation phase or renegotiation phase, the wireless power receiver 1020 may transmit a GRQ packet (GRQ/cap) requesting a capability packet (CAP) of the wireless power transmitter 1010 to the wireless power transmitter 1010 (S1303). The message field of the GRQ/cap may include a header value (0x31) of the capability packet (CAP).

The wireless power transmitter 1010 receiving the GRQ/cap may transmit a capability packet (CAP) to the wireless power receiver 1020 (S1304).

Figures 17, 18:
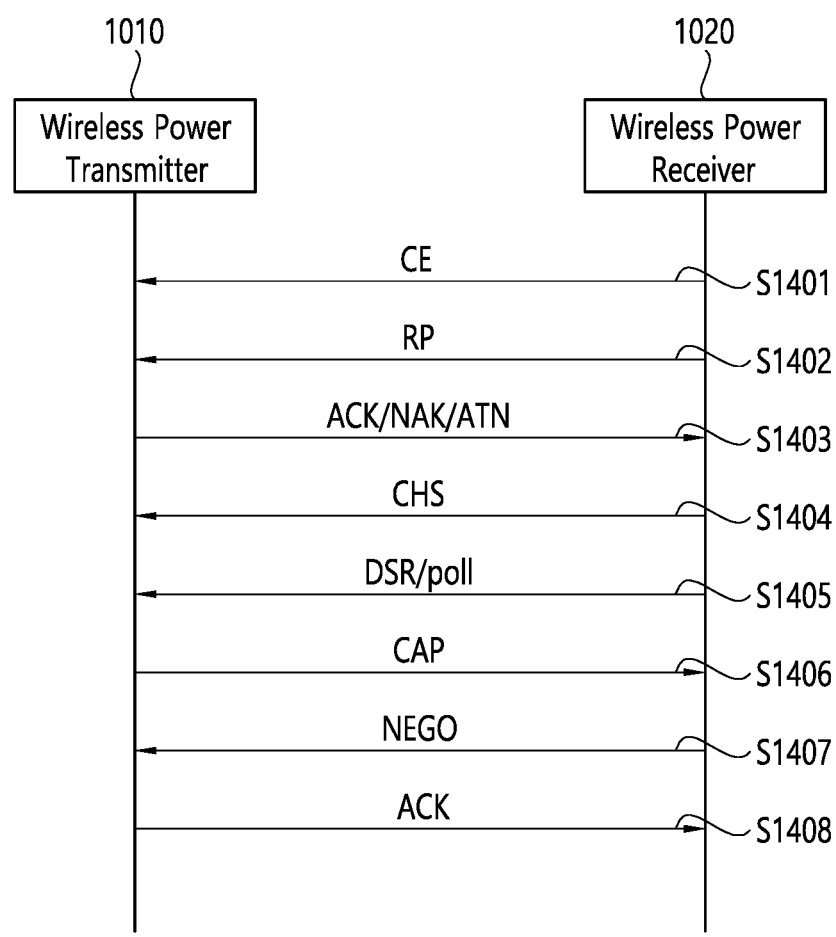
FIG. 17 is a diagram illustrating a message field of a capability packet (CAP) of a wireless power transmitter according to an embodiment.
FIG. 18 is a flowchart schematically illustrating a protocol of a power transmission step according to an embodiment.

FIG. 17 is a diagram illustrating a message field of a capability packet (CAP) of a wireless power transmitter according to an embodiment.

A capability packet (CAP) according to an embodiment may have a header value of 0x31, and referring to FIG. 17, may include a message field of 3 bytes.

Referring to FIG. 17, a 1-bit authentication (AR) flag and a 1-bit out-of-band (OB) flag may be included in the message field of the capability packet (CAP).

The authentication flag AR indicates whether the wireless power transmitter 1010 supports the authentication function. For example, if the value of the authentication flag AR is '1', it indicates that the wireless power transmitter 1010 supports an authentication function or can operate as an authentication responder, if the value of the authentication flag AR is '0', it may indicate that the wireless power transmitter 1010 does not support the authentication function or cannot operate as an authentication responder.

The out-band (OB) flag indicates whether the wireless power transmitter 1010 supports out-band communication. For example, if the value of the out-band (OB) flag is '1', the wireless power transmitter 1010 instructs out-band communication, if the value of the out-band (OB) flag is '0', it may indicate that the wireless power transmitter 1010 does not support out-band communication.

In the negotiation phase, the wireless power receiver 1020 receives a capability packet (CAP) of the wireless power transmitter 1010, it is possible to check whether the wireless power transmitter 1010 supports an authentication function, supports out-of-band communication, and the like.

And, according to FIG. 13, in the negotiation phase or re-negotiation phase, the wireless power receiver 1020 may use at least one specific request packet (SRQ, Specific Request data packet) to update the elements of the Power Transfer Contract related to the power to be provided in the power transfer phase, the negotiation phase or the re-negotiation phase may be ended (S1305).

The wireless power transmitter 1010 may transmit only ACK, only ACK or NAK, or only ACK or ND in response to the specific request packet SRQ according to the type of the specific request packet SRQ (S1306).

In the above-described ping phase, configuration phase, and negotiation/renegotiation phase, a data packet or message exchanged between the wireless power transmitter 1010 and the wireless power receiver 1020 may be transmitted/received through in-band communication.

FIG. 18 is a flowchart schematically illustrating a protocol of a power transmission step according to an embodiment.

In the power transfer phase, the wireless power transmitter 1010 and the wireless power receiver 1020 may transmit/receive wireless power based on a power transfer contract.

Referring to FIG. 18, in the power transfer phase, the wireless power receiver 1020 transmits a control error data packet (CE) including information on the difference between the actual operating point and the target operating point to the wireless power transmitter 1010 (S1401).

Also, in the power transfer phase, the wireless power receiver 1020 transmits a received power packet (RP, Received Power data packet) including information on the received power value of the wireless power received from the wireless power transmitter 1010 to the wireless power transmitter 1010 (S1402).

In the power transfer phase, the control error packet (CE) and the received power packet (RP) are data packets that are repeatedly transmitted/received according to timing constraints required for wireless power control.

The wireless power transmitter 1010 may control the level of wireless power transmitted based on the control error packet (CE) and the received power packet (RP) received from the wireless power receiver 1020.

The wireless power transmitter 1010 may respond with an 8-bit bit pattern such as ACK, NAK, ATN, etc. to the received power packet (RP) (S1403).

For a received power packet (RP/0) with a mode value of 0, when the wireless power transmitter 1010 responds with ACK, it means that power transmission can continue at the current level.

For a received power packet (RP/0) with a mode value of 0, when the wireless power transmitter 1010 responds with NAK, it means that the wireless power receiver 1020 should reduce power consumption.

For a received power packet (RP/1 or RP/2) having a mode value of 1 or 2, when the wireless power transmitter 1010 responds with ACK, it means that the wireless power receiver 1020 has accepted the power correction value included in the received power packet (RP/1 or RP/2).

For a received power packet (RP/1 or RP/2) having a mode value of 1 or 2, when the wireless power transmitter 1010 responds with NAK, it means that the wireless power receiver 1020 does not accept the power correction value included in the received power packet RP/1 or RP/2.

About Receive Power Packet (RP), when the wireless power transmitter 1010 responds with ATN, it means that the wireless power transmitter 1010 requests permission for communication.

The wireless power transmitter (1010) and the wireless power receiver (1020) can control the transmitted/received power level based on a control error packet (CE), a received power packet (RP), and a response to the received power packet (RP).

Also, in the power transfer phase, the wireless power receiver 1020 transmits a charge status data packet (CHS) including information on the charge state of the battery to the wireless power transmitter 1010 (S1404). The wireless power transmitter 1010 may control the power level of the wireless power based on the information on the state of charge of the battery included in the state of charge packet (CHS).

Meanwhile, in the power transfer phase, the wireless power transmitter 1010 and/or the wireless power receiver 1020 may enter a renegotiation phase to renew the power transfer contract.

In the power transfer phase, when the wireless power transmitter 1010 wants to enter the renegotiation phase, the wireless power transmitter 1010 responds to the received power packet (RP) with ATN. In this case, the wireless power receiver 1020 may transmit a DSR/poll packet to the wireless power transmitter 1010 to give the wireless power transmitter 1010 an opportunity to transmit a data packet (S1405).

When the wireless power transmitter 1010 transmits a performance packet (CAP) to the wireless power receiver 1020 in response to the DSR/poll packet (S1406), the wireless power receiver 1020 transmits a renegotiation packet (NEGO) requesting the progress of the re-negotiation phase to the wireless power transmitter 1010 (S1407), when the wireless power transmitter 1010 responds with an ACK to the renegotiation packet (NEGO) (S1408), the wireless power transmitter 1010 and the wireless power receiver 1020 enter a re-negotiation phase.

In the power transfer phase, when the wireless power receiver 1020 wants to enter the re-negotiation phase, the wireless power receiver 1020 transmits a renegotiation packet (NEGO) requesting the progress of the re-negotiation phase to the wireless power transmitter 1010 (S1407), when the wireless power transmitter 1010 responds with an ACK to the renegotiation packet (NEGO) (S1408), the wireless power transmitter 1010 and the wireless power receiver 1020 enter a re-negotiation phase.

Meanwhile, the wireless power transmission system may have an application layer message exchange function to support expansion into various application fields. Based on this function, device authentication related information or other application level messages may be transmitted and received between the wireless power transmitter 1010 and the wireless power receiver 1020. In this way, in order to exchange upper layer messages between the wireless power transmitter 1010 and the wireless power receiver 1020, A separate hierarchical architecture for data transmission is required, an efficient management and operation method of hierarchical architecture is required.

Hereinafter, this Specification Will be Described in More Detail.

According to the prior art, in a process of authenticating messages exchanged between a wireless power transmitter and a wireless power receiver, a field for checking integrity of data and a method of using the field have not been defined.

Accordingly, in the present specification, a configuration for filtering validity of a wireless power data packet based on integrity information and time information will be described through drawings.

Here, the integrity information may be mixed with MAC or MIC (Message Integrity Check) for convenience of description, time information may be mixed with a time stamp period packet and/or a one time password (OTP) and/or a time packet for convenience of explanation.

The wireless power receiver (or wireless power transmitter) may check the integrity field of the data packet it has received. Here, as a result of checking the integrity field, if the integrity field indicates that the data packet is valid, the wireless power receiver (or wireless power transmitter) determines that no modulation is applied to the data packet, thereafter, wireless power transmission/communication may be performed between the wireless power receiver and the wireless power transmitter using the above data packet.

Contrary to the above, if the integrity field indicates that the data packet is invalid as a result of checking the integrity field by the wireless power receiver (or wireless power transmitter), the wireless power receiver (or wireless power transmitter) determines that modulation has been applied to the data packet, it can discard, drop, or ignore the data packet above.

Meanwhile, although the integrity field indicates that the data packet is valid, hacking by a third device may succeed. In order to provide additional security for this, the present specification intends to provide not only the integrity field but also time information. Here, as described above, the time information may correspond to information indicating a time interval in which the wireless power data packet is valid, it can correspond to some kind of OTP or timestamp or time field.

An example of using the above time information may be as follows. The wireless power receiver (or wireless power transmitter) when the integrity field indicates that the data packet is valid, the time field may be checked in preparation for a relay attack (e.g., hacking by a third device). Thereafter, the wireless power receiver (or wireless power transmitter) may transmit/receive wireless power based on the data packet only during the valid period indicated by the time field.

If the integrity field indicates that the data packet is valid, but the validity period has passed as a result of checking the time field, the wireless power receiver (or wireless power transmitter) may ignore the data packet. Here, the above time field (or time information) may be linked to a specific device and user account. That is, even if the wireless power receiver (or wireless power transmitter) is not modulated, it can check the time field in preparation for a relay attack and process only valid packets in conjunction with a specific device and user account.

For a smooth understanding of the present specification, the above contents may be described as follows through drawings.

Figure 19:
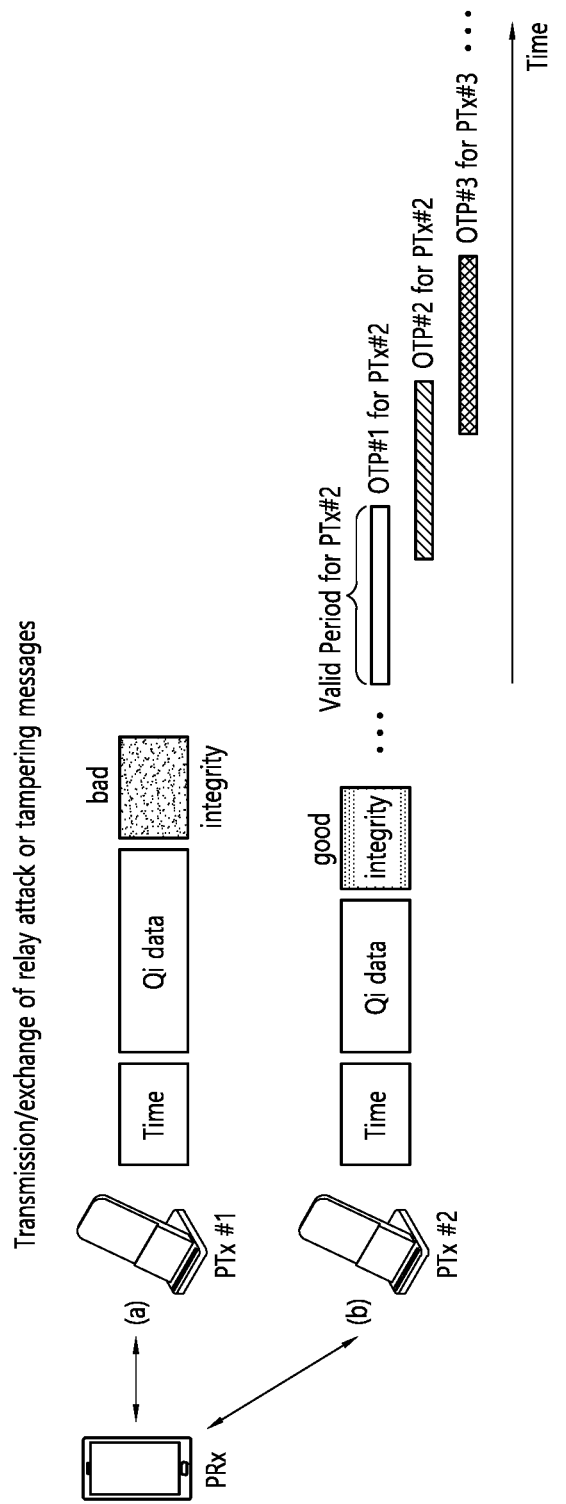
FIG. 19 schematically illustrates an example of filtering validity of a wireless power data packet based on integrity information and time information.

FIG. 19 schematically illustrates an example of filtering validity of a wireless power data packet based on integrity information and time information.

(a) of FIG. 19 schematically illustrates an example in which relay attack or modulated messages are exchanged between a wireless power transmitter #1 (PTx #1) and a wireless power receiver (PRx). (b) of FIG. 19 schematically illustrates an example in which messages including an integrity field indicating validity of a data packet are exchanged between the wireless power transmitter #2 (PTx #2) and the wireless power receiver (PRx).

According to (a) of FIG. 19, the wireless power receiver PRx may receive a wireless power data packet from the wireless power transmitter #1. Here, the wireless power data packet may include time information, wireless power data, and integrity information. Integrity information at this time may indicate that the wireless power data packet is invalid. Here, for example, when the integrity information is 'bad', the integrity information may indicate that the wireless power data packet is invalid.

If the integrity information is 'bad', as described above, the wireless power receiver may discard, drop, or ignore the data packet, in this case, the wireless power receiver may not check the time information described above (However, this specification does not intend to exclude examples of checking time information even when integrity information is 'bad'. That is, depending on implementation, time information may be checked even when integrity information is 'bad').

According to (b) of FIG. 19, the wireless power receiver PRx may receive a wireless power data packet from the wireless power transmitter #2. Here, the wireless power data packet may include time information, wireless power data, and integrity information, integrity information at this time may indicate that the wireless power data packet is valid. Here, for example, when the integrity information is 'good', the integrity information may indicate that the wireless power data packet is valid.

When the wireless power data packet is valid, the wireless power receiver may check time information, that is, a time field. As described above, the time field may indicate a time interval in which the wireless power data packet is valid, for example, in the example of (b) of FIG. 19, the time information may indicate valid time intervals in the form of OTP #1 for wireless power transmitter #2, OTP #2 for wireless power transmitter #2, and OTP #3 for wireless power transmitter #2.

For understanding of the specification, the example of FIG. 19 may be additionally described as follows.

For example, in a packet exchanged with the wireless power transmitter #2, an integrity field may be configured based on a key exchanged through negotiation and a prior process. In addition, the wireless power receiver may check whether the above integrity field is valid and process it. However, since the integrity field of the packet sent by the wireless power transmitter #1 is not valid, the wireless power receiver discards the packet received from the wireless power transmitter #1.

If the wireless power transmitter #1 replicates the packet of the wireless power transmitter #2 based on the relay packet, etc., and constructs a packet having a valid integrity field, if wireless power transmitter #1 interferes with communication between the wireless power receiver and wireless power transmitter #2, the wireless power receiving device checks the time field and allows an attack only for a certain period of time. Even if the integrity field is valid, the wireless power receiver may ignore packets whose validity period according to the time field has passed.

On the other hand, when the value of the Qi data information received in the valid period indicated by the time information changes greatly (i.e., when the change in the received value is greater than a certain level), an anomaly detection function may be implemented. Here, the value for the predetermined level may be preset in the device or may be a value exchanged/transmitted through in-band communication and/or out-band communication.

For example, if there are 5 values of received power obtained within the valid interval and the 5 values are 5 W, 5 W, 6 W, 100 W, and 5 W, an anomaly may be detected and an operation may be performed according to 5 W. In other words, the information about the 100 W value can be ignored even if the integrity part is valid.

In other words, in combination with the previously described embodiment, even if a packet is received within the valid time and passes the integrity check, if the value included in the packet has a large deviation compared to the recently received values, the wireless power transmission/reception device may determine this as an attack and ignore this packet. That is, if the value included in the packet has a large deviation compared to the recently received values, the wireless power transmission/reception device may determine this value as an abnormal value and ignore the above packet.

As an example, the wireless power transmitter receives a wireless power related packet indicating that the integrity information is true within a valid time, if the packet at this time includes a request value that is greater than (or exceeds) a specific value (ie, a request value with a large deviation) than the recently received requested power value, a wireless power transmitter may ignore the above value.

On the other hand, Bluetooth standard technology is divided into core specifications into BR/EDR (Basic Rate/Enhanced Data Rate) and LE (Low Energy). Of these, BR/EDR is a wireless communication technology that occupies a dominant position in the short-distance WPAN technology and is applied to many products.

Bluetooth Low Energy (BLE) is designed to achieve higher energy efficiency compared to the existing Bluetooth BR/EDR.

Meanwhile, wireless charging methods include a magnetic induction method using a magnetic induction phenomenon between a primary coil and a secondary coil, and a magnetic resonance method in which magnetic resonance is performed using a frequency in a band of several tens of kHz to several MHz to transmit power. Here, the wireless charging standard for the magnetic resonance method is led by a conference called A4WP, and the magnetic induction method is led by the WPC (Wireless Power Consortium).

WPC is designed to send and receive various status information and commands related to the wireless charging system in-band. However, in the case of in-band communication, information exchange is relatively slow because it is not a system designed specifically for communication. Accordingly, in-band communication may not be appropriate communication for fast information exchange and exchange of various information.

Under the above background, a method in which information related to a wireless charging system is exchanged by combining out-of-band communication (in other words, out-of-band communication) with a wireless charging system (eg, in-band communication) has been attempted. As representative out-of-band technologies, NFC and BLE technologies may correspond to candidate technologies.

On the other hand, in order to wirelessly charge between devices, information is exchanged between devices before charging starts, in addition to this, information for identifying each other's status can be continuously exchanged even during charging.

That is, the wireless power transmitter (PTx) may acquire information on the received power from the wireless power receiver (PRx) based on OOB (e.g. BLE) communication (For convenience of description, it has been described that information on received power is obtained through out-of-band communication, but in this specification, an example in which information on received power is obtained through in-band communication is also provided). The wireless power transmitter calculates transmission power using the obtained information.

In the above situation, if a third device intervenes and sends incorrect data to the wireless power transmitter or wireless power receiver, a normal wireless power transmission operation cannot be performed between the wireless power transmitter and the wireless power receiver.

As an example of a third device intervening between a wireless power transmitter and a wireless power receiver, there is, for example, a cross connection issue. Here, an example of cross connection will be described through drawings.

Figure 20:
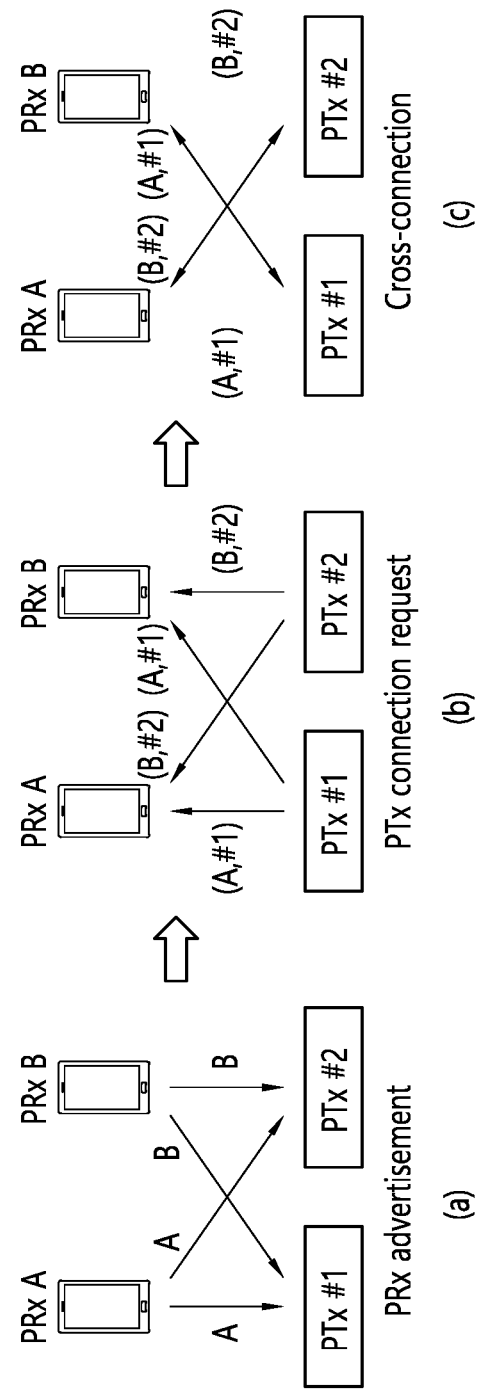
FIG. 20 schematically illustrates an example of cross connection.

FIG. 20 schematically illustrates an example of cross connection.

According to FIG. 20, it is assumed that a BLE connection for wireless charging must be performed between wireless power transmitter 1 and wireless power receiver A and a BLE connection for wireless charging must be performed between wireless power transmitter 2 and wireless power receiver B.

Here, as shown in (a) of FIG. 20, the wireless power receiver A and the wireless power receiver B may each perform advertisement. And, based on the fact that the wireless power receiver A and the wireless power transmitter 1 and the wireless power transmitter 2 are in close proximity, the wireless power receiver A at this time can transmit its advertisement to the wireless power transmitter 1 and the wireless power transmitter 2. Similarly, based on the proximity of the wireless power receiver B and the wireless power transmitter 1 and the wireless power transmitter 2, the wireless power receiver B at this time can transmit its advertisement to the wireless power transmitter 1 and the wireless power transmitter 2.

After performing advertisement, wireless power transmitter 1 may transmit a connection request to wireless power receiver A and wireless power receiver B, as shown in (b) of FIG. 20. Similarly, the wireless power transmitter 2 may transmit a connection request to the wireless power receiver A and the wireless power receiver B.

In the above situation, as explained earlier, BLE connection for wireless charging must be performed between wireless power transmitter 1 and wireless power receiver A, and BLE connection for wireless charging must be performed between wireless power transmitter 2 and wireless power receiver B. However, as shown in (c) of FIG. 20, a BLE connection may be established between the wireless power transmitter 1 and the wireless power receiver B, and a BLE connection may be established between the wireless power transmitter 2 and the wireless power receiver A. And the above situation can be referred to as cross-connection.

The reason for the cross connection as described above is that the range of BLE OOB communication is wider than the effective range of wireless charging between the wireless power transmitter and the wireless power receiver. Due to this, a problem may occur in that the wireless power transmitter performs a BLE connection with a wireless power receiver in a range in which the wireless power transmitter itself cannot transmit wireless power. That is, the wireless power transmitter may make an error of unnecessarily performing a BLE connection with a wireless power receiver located in a location where wireless power cannot be performed.

Accordingly, in the present specification, it is intended to provide a configuration so as to accurately identify a target wireless power receiver placed on the wireless power transmitter, that is, to perform wireless power transmission, wireless power transmitter accurately performs BLE connection with above wireless power receiver. In addition, the present specification intends to provide a definition of a packet format used in communication using BLE in order to support a mobile laptop profile that supports, for example, 15 W or more laptop charging.

The following drawings are made to explain a specific example of the present specification. Since the names of specific devices or names of specific signals/messages/fields described in the drawings are provided as examples, the technical features of the present specification are not limited to the specific names used in the drawings below.

Figure 21:
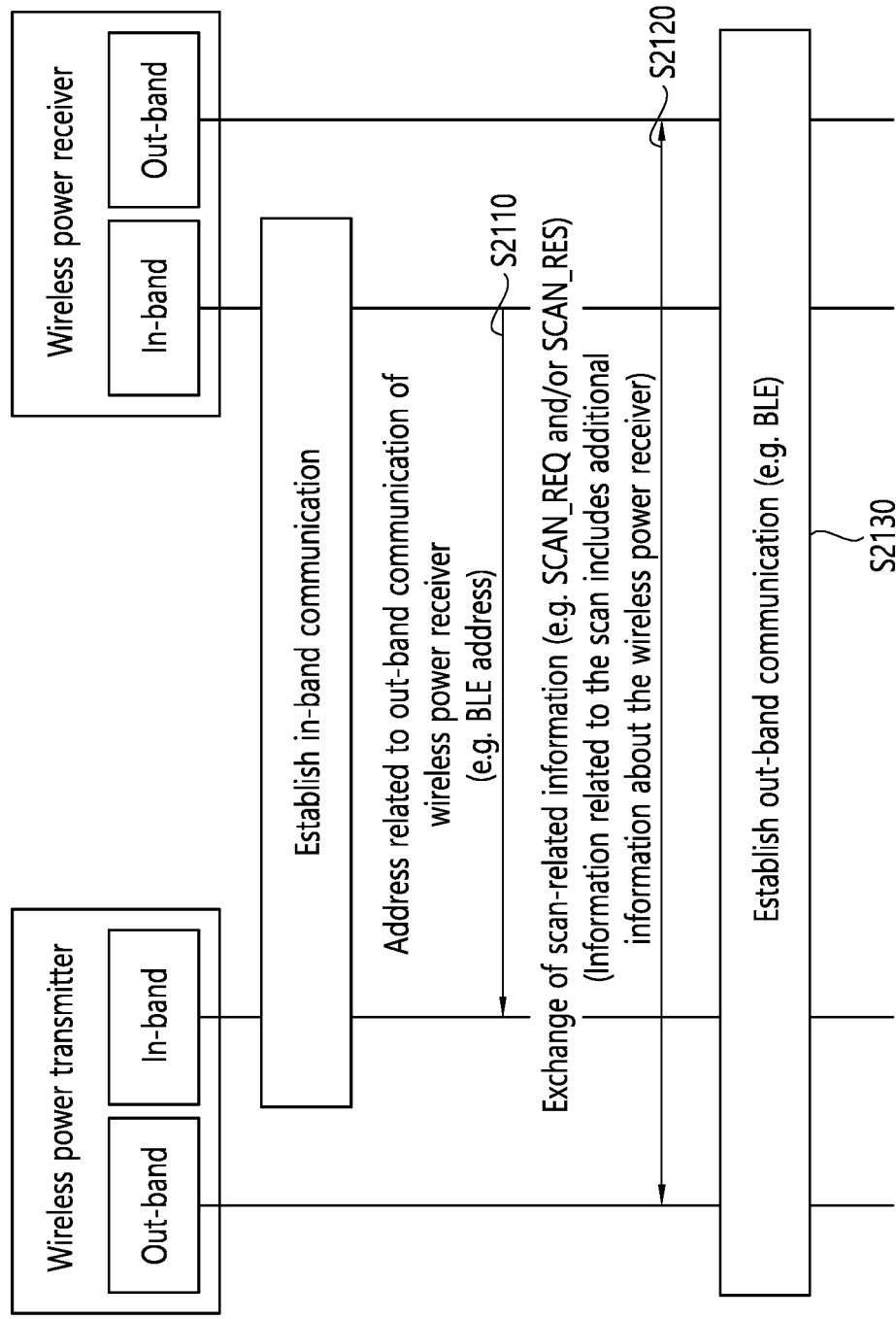
FIG. 21 is a flowchart of a method of transmitting an address related to out-band communication according to an embodiment of the present specification.

FIG. 21 is a flowchart of a method of transmitting an address related to out-band communication according to an embodiment of the present specification.

According to FIG. 21, the wireless power receiver may transmit an address related to the out-band communication of the wireless power receiver to the wireless power transmitter through in-band communication established with the wireless power transmitter (S2110).

In this case, an address related to out-band communication of the wireless power receiver may be transmitted in the in-band in the form of, for example, an ADD packet. That is, the wireless power receiver may transmit an ADD (address) packet (or information) to the wireless power receiver through in-band communication. The ADD packet at this time may be, for example, the BLE address of the wireless power receiver, and more specifically, the BLE address of the 48-bit randomized wireless power receiver.

The wireless power receiver may exchange scan-related information with the wireless power transmitter before the out-band communication is established (S2120).

The wireless power receiver may establish the out-band communication (in other words, establish an out-band communication connection) based on the address related to the out-band communication and information related to the scan (S2130).

Here, the information related to the scan may include additional information about the wireless power receiver. In this specification, for convenience of description, the above 'additional information', 'additional negotiation information', and 'negotiation information' may be used interchangeably.

For example, the in-band communication may be communication based on a power signal of wireless power, and the out-band communication may be communication based on Bluetooth. Here, a specific example for this is the same as the bar described above (or described later).

For example, the out-band communication may be bluetooth low energy (BLE) communication. Here, a specific example for this is the same as the bar described above (or described later).

For example, exchanging information related to the scan may include the following process. The wireless power receiver receives scan request information from the wireless power transmitter, the scan request information (SCAN_REQ) is information requesting additional information about the wireless power receiver, and the wireless power receiver transmits scan response information (SCAN_RES) to the wireless power transmitter in response to the scan request information, the scan response information may be additional information about the wireless power receiver. Here, a specific example for this is the same as the bar described above (or described later).

For example, the additional information may include at least one of information related to a random ID of the wireless power receiver, information related to a time stamp, or a message to which an integrity check for forgery or tamper prevention is added. Here, a specific example for this is the same as the bar described above (or described later).

For example, when the BLE communication is not established within a specific time, the wireless power receiver and the wireless power transmitter may continue the in-band communication. Here, for example, the above specific time may be 60 seconds. Here, a specific example for this is the same as the bar described above (or described later).

For example, when the BLE communication is established within the specific time period, the wireless power receiver and the wireless power transmitter may perform the established BLE communication. Here, for example, the above specific time may be 60 seconds. Here, a specific example for this is the same as the bar described above (or described later).

For example, whether the BLE communication is established within the specific time period may be determined based on a timer. Here, a specific example for this is the same as the bar described above (or described later).

For example, the wireless power receiver may transmit additional information about the wireless power receiver to the wireless power transmitter through the in-band communication. Here, a specific example for this is the same as the bar described above (or described later).

In the example of FIG. 21, an example in which scan-related information (e.g. SCAN_REQ and/or SCAN_RES) is exchanged may be described in more detail through the drawing as follows.

Figure 22:
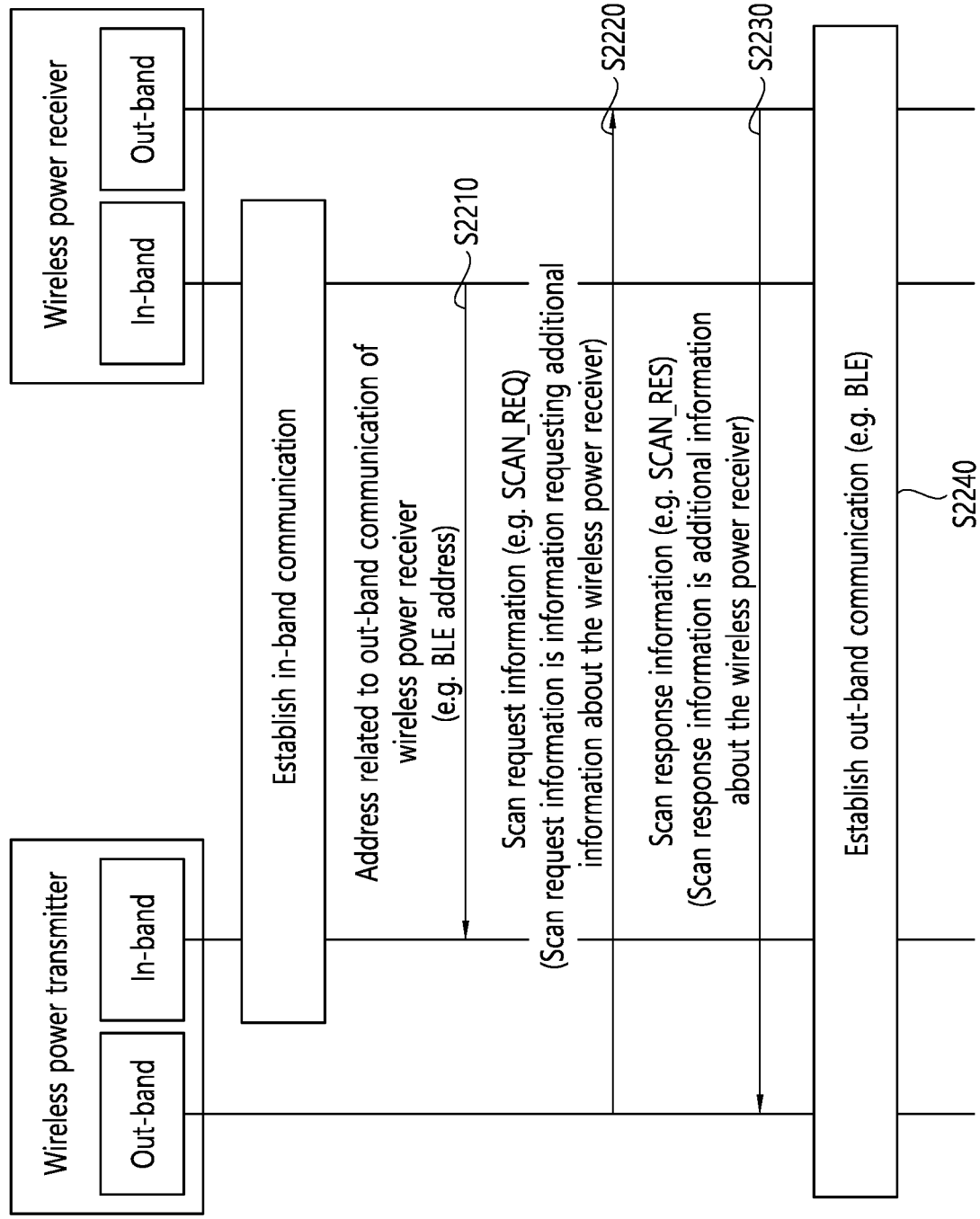
FIG. 22 is a flowchart of a method of transmitting an address related to out-band communication according to another embodiment of the present specification.

FIG. 22 is a flowchart of a method of transmitting an address related to out-band communication according to another embodiment of the present specification.

According to FIG. 22, the wireless power receiver may transmit an address related to the out-band communication of the wireless power receiver to the wireless power transmitter through in-band communication established with the wireless power transmitter (S2210).

The wireless power receiver may receive scan request information (e.g. SCAN_REQ) from the wireless power transmitter (S2220). Here, the scan request information may be information requesting additional information about the wireless power receiver.

Thereafter, the wireless power receiver may transmit scan response information (e.g. SCAN_RES) to the wireless power transmitter (S2230). Here, the scan response information may be additional information about the wireless power receiver.

The wireless power receiver may establish the out-band communication (out-band communication connection) based on the address related to the out-band communication and information related to the scan (S2240). Here, a specific example for this is the same as the bar described above (or described later).

Here, the information related to the scan may include additional information about the wireless power receiver. Here, a specific example for this is the same as the bar described above (or described later).

Hereinafter, the embodiments of the present specification will be described in more detail. The configurations proposed in this specification, described below, may be applied to all of the embodiments described in this specification.

1. Data Definition for the Purpose of Checking BLE Devices within the Qi Effective Charging Range (to Prevent BLE Cross Connection)

According to the present specification, a configuration in which negotiation information (BLE address, random number, timestamp, etc.) is exchanged between a wireless power transmitter and a wireless power receiver through in-band prior to BLE connection may be provided. Accordingly, upon BLE connection, whether the device is within the Qi charging range can be confirmed by allowing the wireless power transmitter and/or the wireless power receiver to verify the negotiation information exchanged in advance.

Meanwhile, it has been described above that the negotiation information is transmitted through in-band, but this is merely an embodiment of the present specification.

That is, information proposed in this specification may be exchanged between a wireless power transmitter and a wireless power receiver through the following communication protocol.

1) Negotiation Phase in In-Band Communication
2) BLE Advertising
3) Extended Advertising with BT (bluetooth) version 5 or higher
4) SCAN response to BLE or BT version 5 or higher SCAN request At this time, an example of the exchanged information will be described through drawings.

Figure 23:
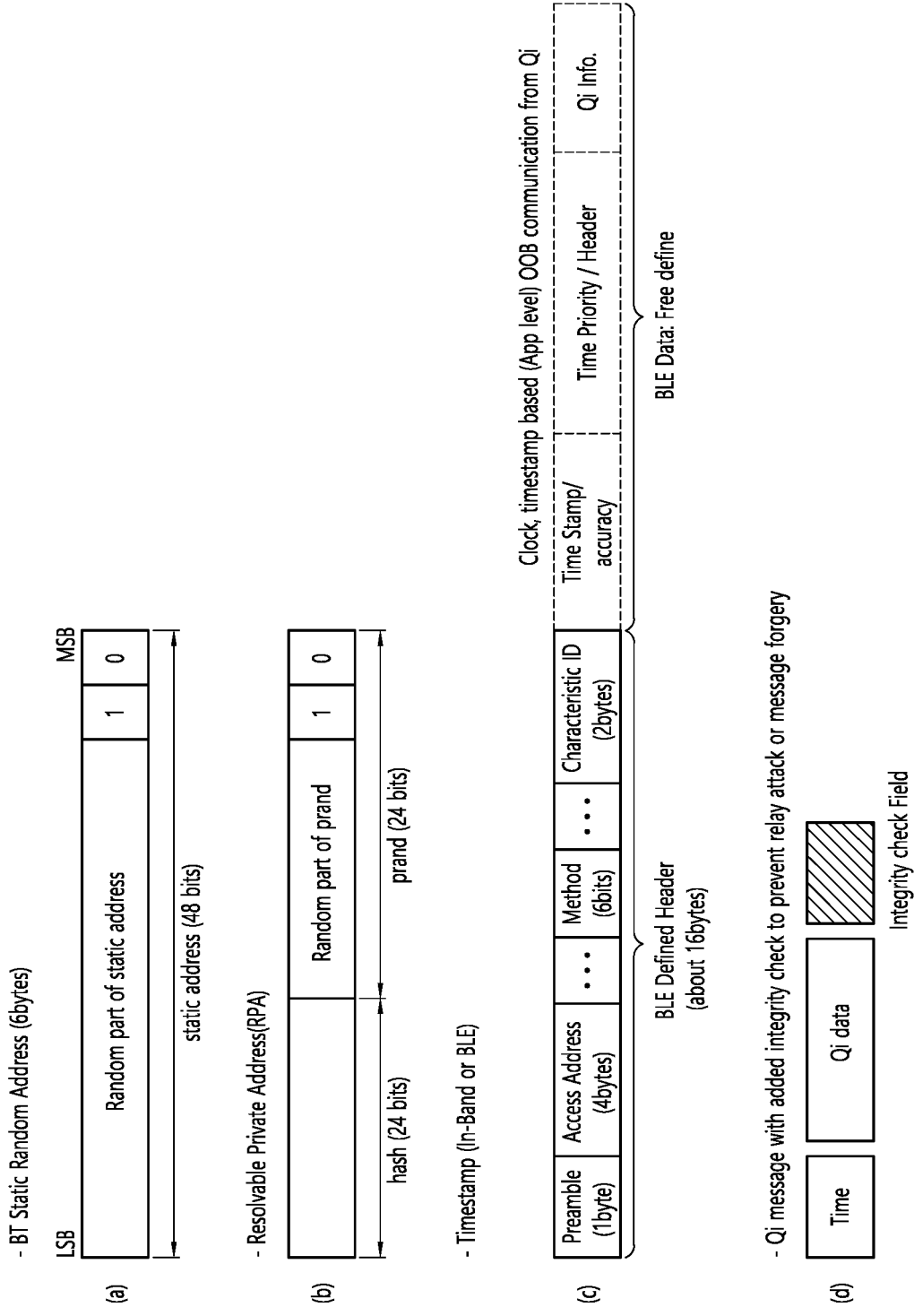
FIG. 23 shows examples of information proposed in this specification, respectively.

FIG. 23 shows examples of information proposed in this specification, respectively.

According to (a) of FIG. 23, 'BT Static Random Address' may be exchanged between the wireless power transmitter and the wireless power receiver. At this time, the 'BT Static Random Address' may consist of 6 bytes, and the 'BT Static Random Address' may include a random part of a static address.

According to (b) of FIG. 23, a resolvable private address (RPA) may be exchanged between the wireless power transmitter and the wireless power receiver. To generate a resolvable private address, the device must have either a Local IRK (Identity Resolving Key) or a Peer IRK (Identity Resolving Key).

For example, a local hash may be generated using IRK according to the following formula.

$$\text{Local hash}=ah(IRK, prand) \qquad \text{[Equation 1]}$$

Here, the localHash value can be compared with the hash value extracted from RPA. If the localHash value matches the extracted hash value, the ID of the peer device has been resolved. In the negotiation phase, the wireless power receiver may send an IRK key to the wireless power transmitter using IB.

If the previous contents are summarized once again from the viewpoint of creation and disassembly of RPA, it can be as follows.

Creation of RPA

A resolvable private address is created with IRK and prand. A prand is randomly generated and can meet the following requirements:

For example, the two most significant bits of prand may need to equal 2b01. Also, all bits of prand cannot be zero. In addition, all bits of prand cannot be 1.

The hash portion of the address can be generated using this prand and the device's 128-bit IRK. Here, for example, to make the length of prand equal to IRK, prand may be concatenated with 104-bit padding with padding bits set to 0). The original prand's LSB can be maintained as the prand's LSB after padding. Then, an arbitrary address can be generated by concatenating the prand and the hash.

Decomposition of RPA

A resolvable private address can be resolved at a device if it has the peer device's IRK. As mentioned earlier, a resolvable private address has a 24-bit prand and a 24-bit hash. The peer device's prand and IRK can be used to resolve the address.

When the device receives a resolvable private address, it extracts the hash and prand. Then, a local hash value is generated using the IRK of the peer device and the prand extracted from the corresponding address. A hash can be generated in the same way as address generation.

This local hash value can be compared with the hash extracted from the address, and if they match, the above address can be decomposed.

According to (c) of FIG. 23, time stamps may be exchanged between the wireless power transmitter and the wireless power receiver through in-band or BLE.

At this time, the exchanged time stamp may be composed of, for example, 'time stamp/accuracy', 'time priority/header', and 'Qi info'. Here, when the above information is transmitted through BLE, the above information may be included in the BLE data field and transmitted, and the BLE data field may be transmitted together with a header defined in BLE. At this time, the header defined in BLE may include 'preamble', 'access address', 'method', 'characteristic ID', and the like.

According to (d) of FIG. 23, a Qi message to which an integrity check for preventing relay attack or message forgery may be added may be exchanged between the wireless power transmitter and the wireless power receiver. Since the specific example at this time has been previously described in FIG. 19, in order to avoid repetitive description of overlapping content, description of overlapping content will be omitted.

So far, the negotiation information provided in this specification has been described. Some of the information described above may be transmitted through in-band communication, and the other part may be transmitted in the form of 'additional information' described above.

As an example, the BLE address of the wireless power receiver may be transmitted from the wireless power receiver to the wireless power transmitter through in-band communication. And, before establishing out-band communication, information such as a random ID of the wireless power receiver and a time stamp may be transmitted as additional information. Here, this example is only an example for the convenience of understanding the present specification, and the embodiments provided in the present specification may be provided in various combinations (For example, an example in which the BLE address and time stamp are transmitted through in-band, and the remaining information is transmitted as additional information, etc.).

2. After Obtaining Additional Device Information (Scan Req/Res) with BLE OOB, BLE Connection Between Devices within Qi Effective Charging Range (i.e., BLE Cross-Connection Prevention Technology)

Figure 24A:
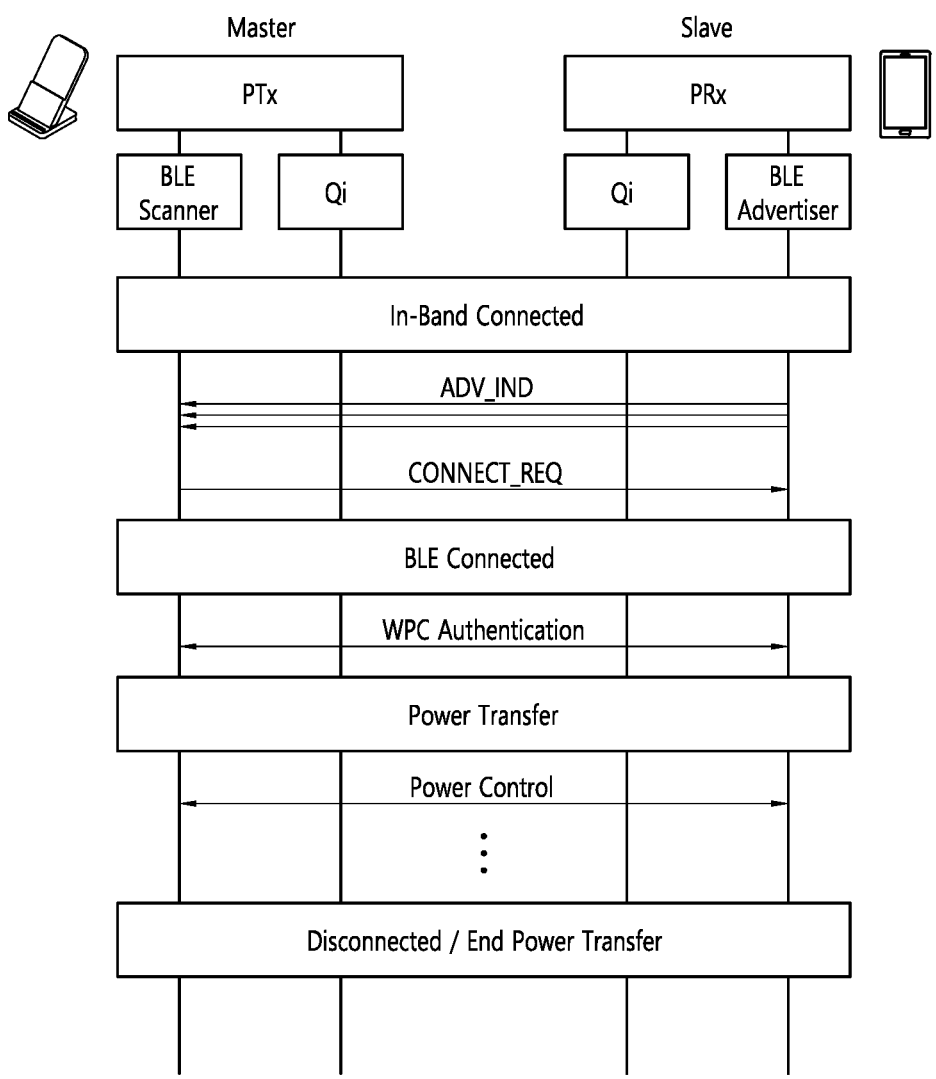
FIGS. 24A and 24B are examples comparing differences between the existing technology and the technology provided in this specification.
Figure 24B:
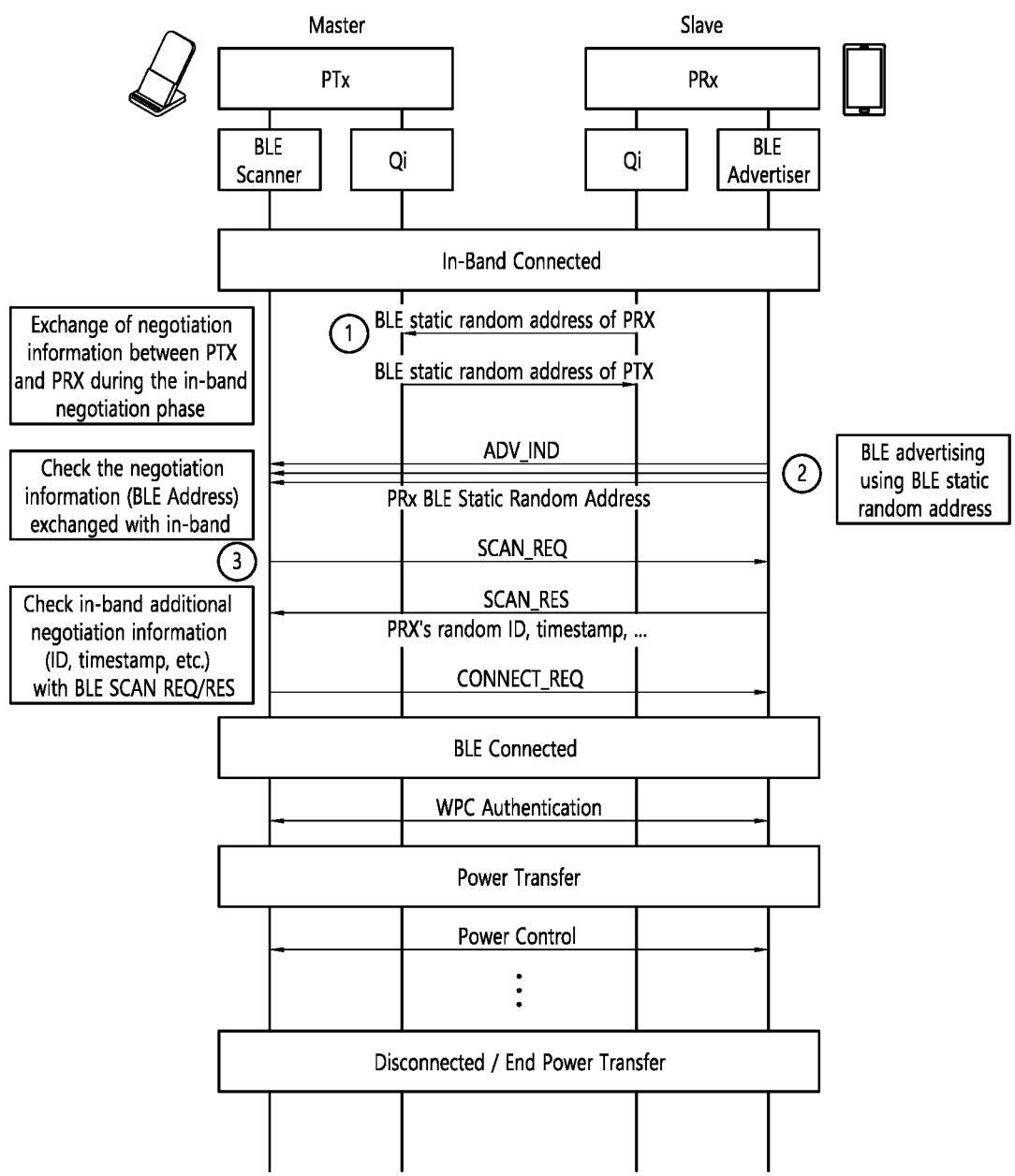

FIGS. 24A and 24B are examples comparing differences between the existing technology and the technology provided in this specification.

FIG. 24A schematically illustrates an example of a BLE connection method according to the prior art.

According to FIG. 24A, a wireless power transmitter and a wireless power receiver may be in an in-band connected state.

In the above situation, the wireless power receiver may transmit an advertisement (e.g. ADV_IND) to the wireless power transmitter, and the wireless power transmitter may scan the advertisement of the wireless power receiver.

If the wireless power transmitter receives an appropriate advertisement from the wireless power receiver, the wireless power transmitter may transmit a connection request (eg, CONNECT_REQ) to the wireless power receiver for a BLE connection.

And the wireless power transmitter and wireless power receiver may establish a BLE connection. And when the BLE connection is established, the state at this time may be named 'BLE Connected'.

Thereafter, WPC authentication may be performed, and power transfer may be performed between the wireless power transmitter and the wireless power receiver.

In the above example, the cross-connection problem, which is the problem described above, may occur. For this reason, since the wireless power transmitter has no information about the wireless power receiver to which it should transfer wireless power, the wireless power transmitter cannot know which device is the wireless power receiver to which it should transfer wireless power.

Therefore, in the following, the wireless power receiver and the wireless power transmitter exchange negotiation information (BLE address, random number, etc.) in advance through in-band, after the wireless power transmitter/wireless power receiver identifies which device is the wireless power transmitter/wireless power receiver that needs to perform the BLE connection based on the exchanged information (i.e., after verifying the device located within the Qi charging range), a method and apparatus for performing a BLE connection by a wireless power transmitter/wireless power receiver are provided.

According to FIG. 24B, the wireless power transmitter and the wireless power receiver may perform the following process.

Step 1: In the in-band negotiation phase, the wireless power transmitter and the wireless power receiver may exchange negotiation information (e.g., the information (s) described above with reference to FIG. 23).

For example, the wireless power receiver may transmit the BLE address (e.g., 'BLE static random address') of the wireless power receiver to the wireless power transmitter through in-band communication. In addition, for example, the wireless power receiver may transmit a BLE address (e.g., 'BLE static random address') of the wireless power transmitter from the wireless power transmitter through in-band communication.

In the drawing, an example in which both the address of the wireless power receiver and the address of the wireless power transmitter are transmitted is shown, but this is only an example for explanation. That is, according to the present specification, only the address of the wireless power receiver can be transmitted, and similarly, only the address of the wireless power transmitter can be transmitted. Of course, an example in which both the address of the wireless power receiver and the address of the wireless power transmitter are transmitted also corresponds to an embodiment of the present specification.

Step 2: On the other hand, (when corresponding to a BLE advertiser), the wireless power receiver may transmit the BLE address (e.g., 'BLE static random address') of the wireless power receiver to the wireless power transmitter. Here, the BLE address in this step may be transmitted through an advertisement message (e.g., ADV_IND).

In addition, the wireless power transmitter receiving the BLE address from the wireless power receiver may check whether the BLE address previously received by the wireless power transmitter through in-band communication and the BLE address newly received through the advertisement message match.

Step 3: The wireless power receiver and the wireless power transmitter may exchange in-band additional (negotiation) information through scan information. That is, in-band additional negotiation information (ID, timestamp, etc.) can be confirmed by the wireless power receiver/wireless power transmitter through the BLE SCAN REQ/RES.

In summary, the wireless power receiver receives scan request information from the wireless power transmitter, and the scan request information may be information requesting additional information about the wireless power receiver. The wireless power receiver may transmit scan response information to the wireless power transmitter in response to the scan request information, and the scan response information may include additional information about the wireless power receiver.

3. BLE OOB Connection Using Qi Timestamp

Figure 25:
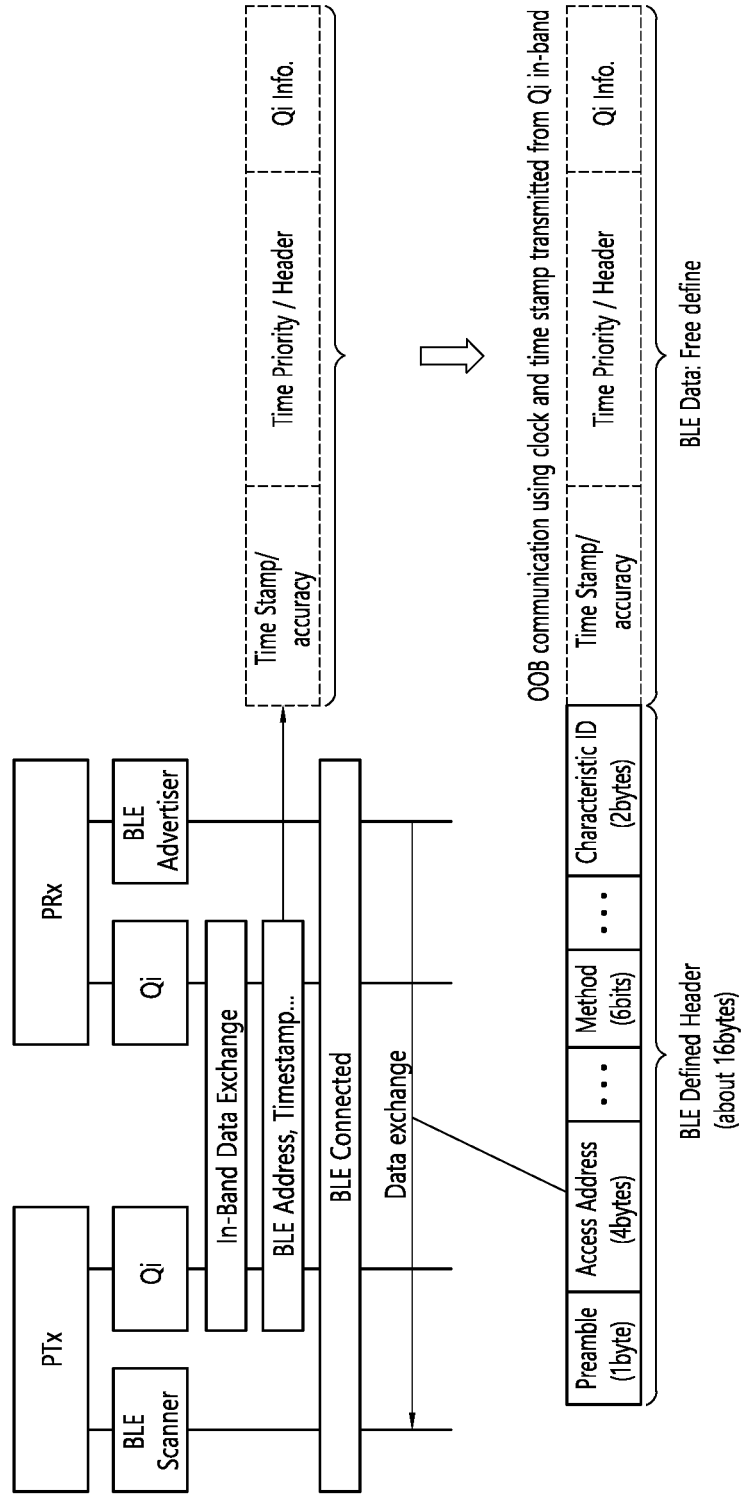
FIG. 25 illustrates an example of a BLE connection using a time stamp.

FIG. 25 illustrates an example of a BLE connection using a time stamp.

According to FIG. 25, a time stamp as well as a BLE address may be exchanged between a wireless power transmitter and a wireless power receiver.

In other words, through in-band communication, the wireless power receiver may transmit additional information such as a time stamp along with a BLE address to a wireless power transmitter located within an effective charging range.

Alternatively, through in-band communication, the wireless power receiver may receive additional information such as a time stamp along with a BLE address from a wireless power transmitter located within an effective charging range.

Meanwhile, as in the example in (c) of FIG. 23 described above, the above-described additional information may be exchanged between the wireless power transmitter and the wireless power receiver through BLE.

The wireless power transmitter (and/or wireless power receiver) (which has received additional information such as a timestamp along with the above BLE address) can prevent cross-connection by performing an additional validation procedure by delivering a (new) time stamp within a valid authentication time (ex. in-band time stamp+within 500 ms).

Here, when configuring a time stamp with Qi in-band, the clock of the device can be referred to. That is, the clock operation can basically utilize the Qi system clock. In other words, a time stamp based on a clock may be delivered after a PING/CONFIG/NEGOTIATION process in-band. And, if the clock operating method is determined, 'Clock accuracy' and 'resolution' information for the corresponding clock can be shared.

For convenience of understanding, the examples in the drawings are once again summarized and described as follows.

The wireless power receiver may transmit a time stamp together with the BLE address to the wireless power transmitter through in-band. And, the time stamp here may be information representing a valid time of information transmitted together. For example, in the example of FIG. 25, when the BLE address of the wireless power receiver is transmitted to the wireless power transmitter, the time stamp at this time may mean the time when the BLE address of the wireless power receiver is valid.

And, as described above, the wireless power transmitter may receive the BLE address of the wireless power receiver through an advertising message from the wireless power receiver.

If, within the above time stamp period, the wireless power transmitter receives an advertisement message including the same BLE address as the BLE address received through in-band communication from the wireless power receiver, the wireless power transmitter may determine that the wireless power receiver transmitting the same BLE address is a device within a valid charging range. In addition, the wireless power transmitter may perform a BLE connection with the wireless power receiver.

And if, within the period of the above time stamp, the wireless power transmitter receives an advertisement message including a BLE address different from the BLE address received through in-band communication from the wireless power receiver, the wireless power transmitter may not perform a BLE connection with a wireless power receiver that has transmitted a different BLE address.

Also, if, after the above time stamp period has elapsed, the wireless power transmitter receives an advertisement message including the same BLE address as the BLE address received through in-band communication from the wireless power receiver, even if it is the same BLE address, the wireless power transmitter may not perform a BLE connection with the wireless power receiver that has transmitted the above BLE address.

4. Set the Effective Time of Connection with the Wireless Power Receiver Located within the Effective Wireless Charging Range of the Wireless Power Transmitter.

Meanwhile, in the present specification, a configuration for determining whether the BLE connection is performed within the BLE connection effective time is provided by setting the BLE connection valid time between the wireless power transmitter and the wireless power receiver.

Figure 26:
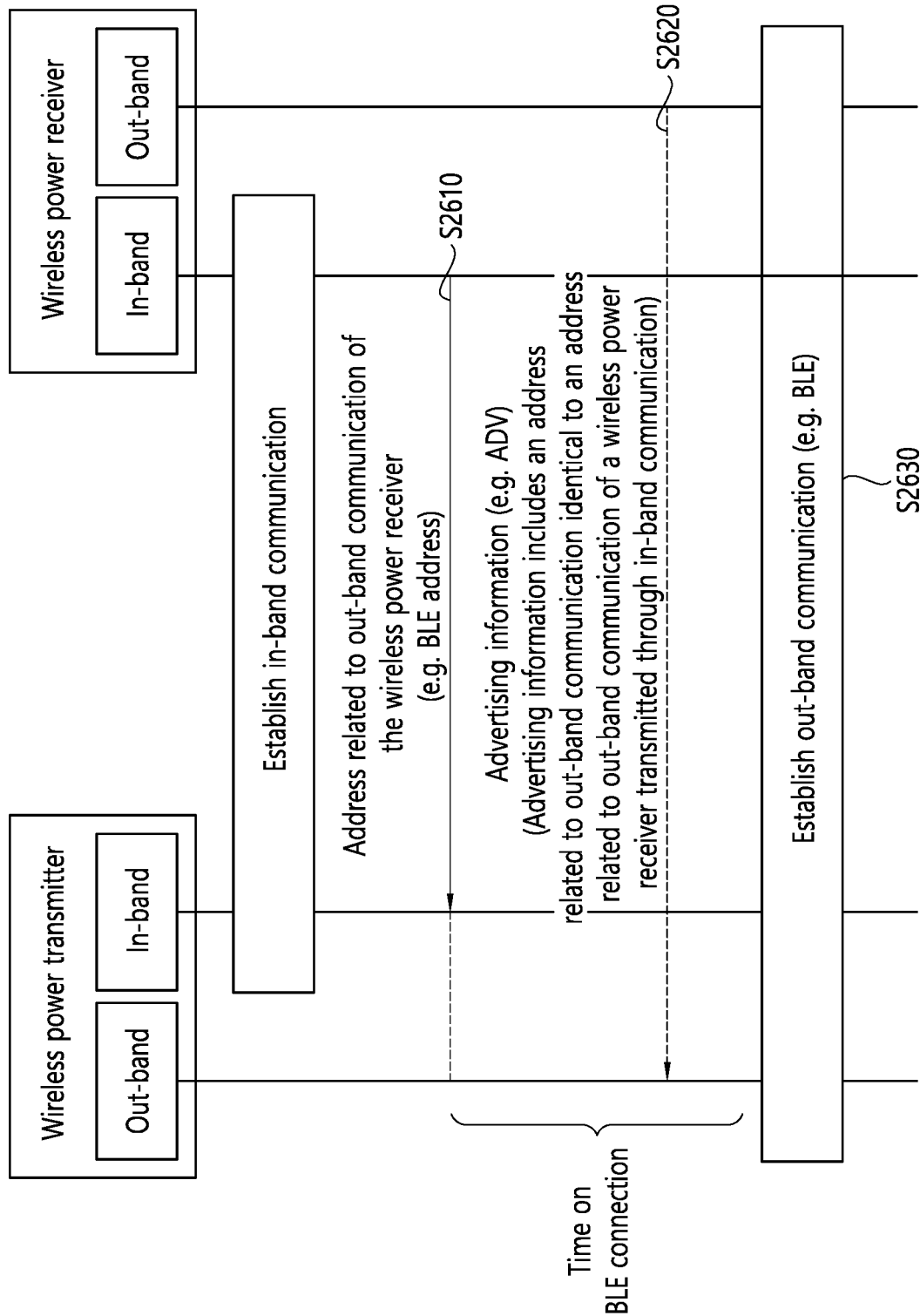
FIG. 26 is a flowchart of a method for determining whether a BLE connection is performed within an effective time according to an embodiment of the present specification.

FIG. 26 is a flowchart of a method for determining whether a BLE connection is performed within an effective time according to an embodiment of the present specification.

According to FIG. 26, the wireless power transmitter may receive an address (e.g. BLE address) related to out-band communication of the wireless power receiver from the wireless power receiver through in-band communication (S2610).

Here, when the wireless power transmitter receives an address related to out-band communication of the wireless power receiver, the wireless power transmitter may perform BLE scanning (ie, scanning advertisement information). And the BLE scanning here may be performed for a time (e.g., 60 seconds) related to the BLE connection. Here, a specific example for this is the same as the bar described above (or described later).

Meanwhile, when the wireless power receiver transmits the BLE address, the wireless power receiver may perform BLE advertising. That is, after receiving the BLE address, the wireless power transmitter may receive advertisement information (e.g. ADV) from the wireless power receiver (S2620). Here, the advertisement information may include an address related to out-band communication identical to an address related to out-band communication of the wireless power receiver transmitted through in-band communication.

The wireless power transmitter may establish out-band communication (e.g. BLE) with the wireless power receiver based on receiving the advertisement information during the time of the BLE connection (S2630).

The embodiments of this specification may also be combined with the examples of FIGS. 21 to 25 described above.

For example, the wireless power transmitter in FIG. 26 may exchange scan information with the wireless power receiver, more specifically, the wireless power transmitter may transmit scan request information to the wireless power receiver, the wireless power transmitter may receive additional information about the wireless power receiver by receiving scan response information from the wireless power receiver. Here, a specific example for this is the same as the bar described above (or described later).

Figure 27:
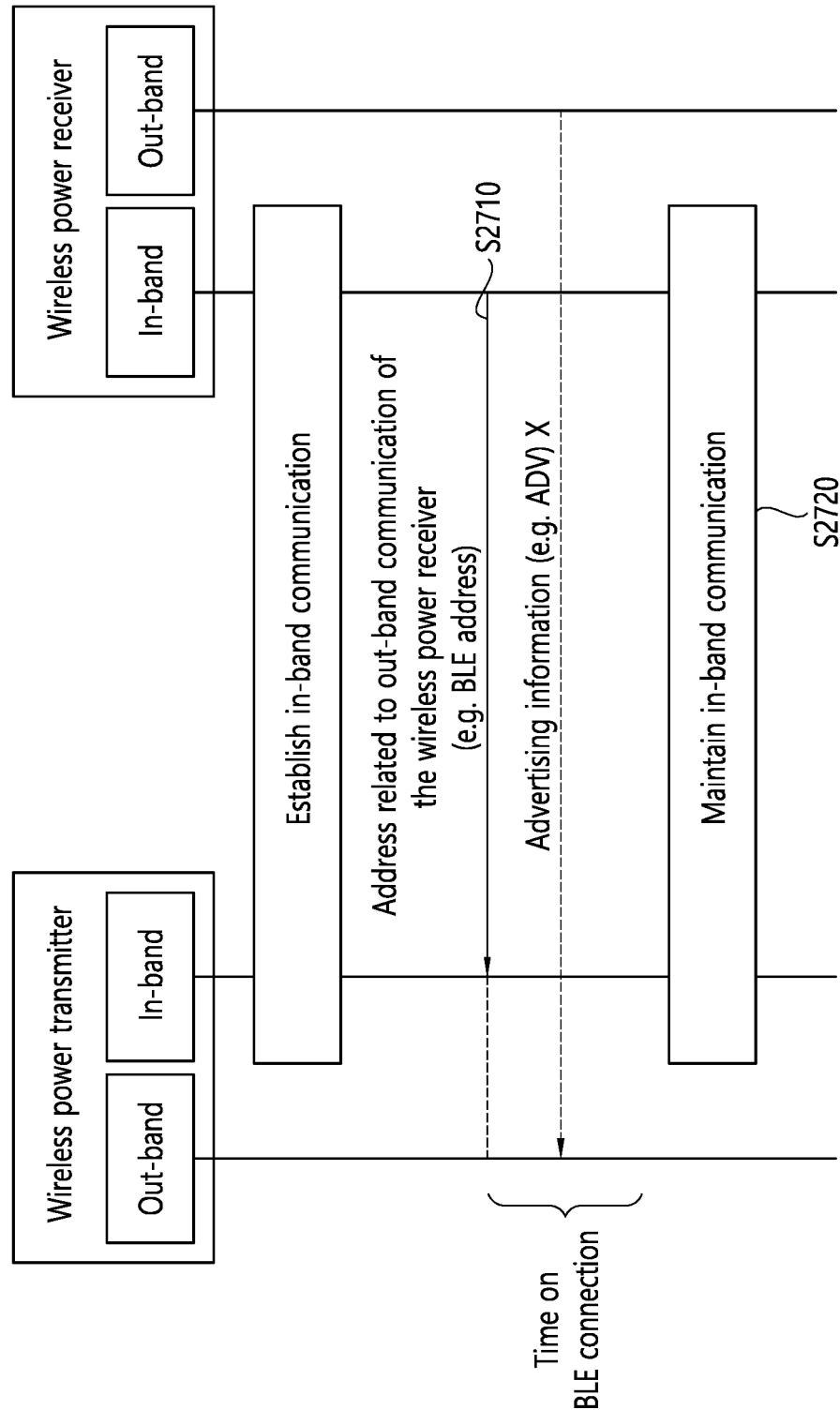
FIG. 27 is a flowchart of a method for determining whether a BLE connection is performed within an effective time according to another embodiment of the present specification.

FIG. 27 is a flowchart of a method for determining whether a BLE connection is performed within an effective time according to another embodiment of the present specification.

According to FIG. 27, the wireless power transmitter may receive an address (e.g. BLE address) related to out-band communication of the wireless power receiver from the wireless power receiver through in-band communication (S2710).

Here, when the wireless power transmitter receives an address related to out-band communication of the wireless power receiver, the wireless power transmitter may perform BLE scanning (i.e., scanning advertisement information). And the BLE scanning here may be performed for a time (e.g., 60 seconds) related to the BLE connection. Here, a specific example for this is the same as the bar described above (or described later).

Meanwhile, when the wireless power receiver transmits the BLE address, the wireless power receiver may perform BLE advertising. Here, a specific example for this is the same as the bar described above (or described later).

However, after receiving the BLE address, the wireless power transmitter may not be able to receive advertisement information (including an address related to out-band communication identical to an address related to out-band communication of a wireless power receiver transmitted through in-band communication) from the wireless power receiver within a time period related to the BLE connection. And, the wireless power transmitter that has not received advertisement information for the time (e.g., 60 seconds) related to the BLE connection may maintain in-band communication (S2720)).

The embodiments of this specification may also be combined with the examples in FIGS. 21 to 25 described above. Here, a specific example for this is the same as the bar described above (or described later).

Meanwhile, the time for BLE connection in this specification may be implemented by a kind of 'timer'.

Figure 28:
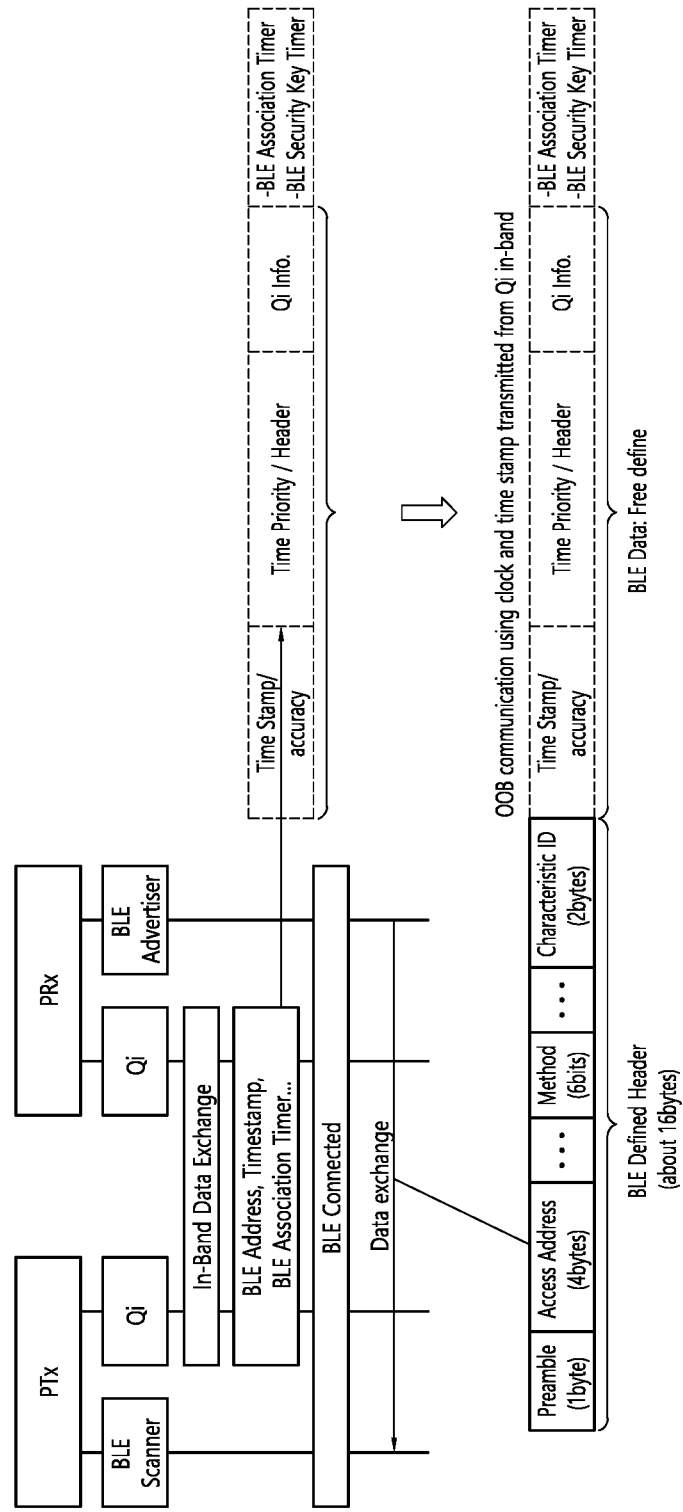
FIG. 28 illustrates an example of a BLE connection using a timer.

FIG. 28 illustrates an example of a BLE connection using a timer.

According to FIG. 28, information on a timer (and/or time stamp) as well as a BLE address may be exchanged between a wireless power transmitter and a wireless power receiver.

In other words, through in-band communication, the wireless power receiver may transmit additional information such as timer information (and/or time stamp) along with a BLE address to a wireless power transmitter located within an effective charging range. Alternatively, through in-band communication, the wireless power receiver may receive additional information such as timer information (and/or time stamp) along with a BLE address from a wireless power transmitter located within an effective charging range.

Meanwhile, as in the example in (c) of FIG. 23 described above, the above-described additional information may be exchanged between the wireless power transmitter and the wireless power receiver through BLE.

Here, for example, the wireless power transmitter that has received information about the timer together with the BLE address may start a 'timer' based on receiving the BLE address from the wireless power receiver. And, before the timer expires, the wireless power transmitter may attempt a BLE connection with the wireless power receiver. If the BLE connection is not performed until the timer expires, the wireless power transmitter and the wireless power receiver may continue in-band communication.

Meanwhile, in the example of FIG. 28, it is described that the wireless power transmitter starts the timer based on receiving information about the timer from the wireless power receiver, but this is only an example provided in the present specification. Accordingly, in an embodiment of the present specification, even when information on the timer is not separately received from the wireless power receiver, the wireless power transmitter may start the timer based on a preset timer value. Alternatively, the value of the above timer may be separately defined in the specification.

In addition, an example in which the value of the above timer is 60 seconds was previously proposed, but this is only an example of the present specification. That is, the value of the above timer may be a value different from 60 seconds.

This example is summarized and explained as follows.

According to FIG. 28, a configuration related to "protocol operation for enhancing security when connecting a device between an OOB (BLE) communication-based wireless power transmitter and a wireless power receiver, and a valid time verification protocol operation of a security key for ensuring privacy" can be proposed.

Here, as described in the drawing, a BLE connection timer, a security key valid time timer, and the like may be transmitted through Qi in-band. In addition, a valid BLE connection can be performed only when the BLE connection is completed within the BLE connection timer.

In addition, security can be enhanced by renewing the security key between the wireless power transmitter and the wireless power receiver before the BLE security key validity time exceeds.

From the point of view of the security manager, in the case of the BLE security manager, the timer may be set to 30 seconds, and the pairing process must be completed within the set timer time (e.g., 30 seconds) to be valid pairing. If the security manager timer reaches 30 seconds, the pairing procedure may be considered failed.

A more specific example of this embodiment may be described below through other drawings.

Figure 29:
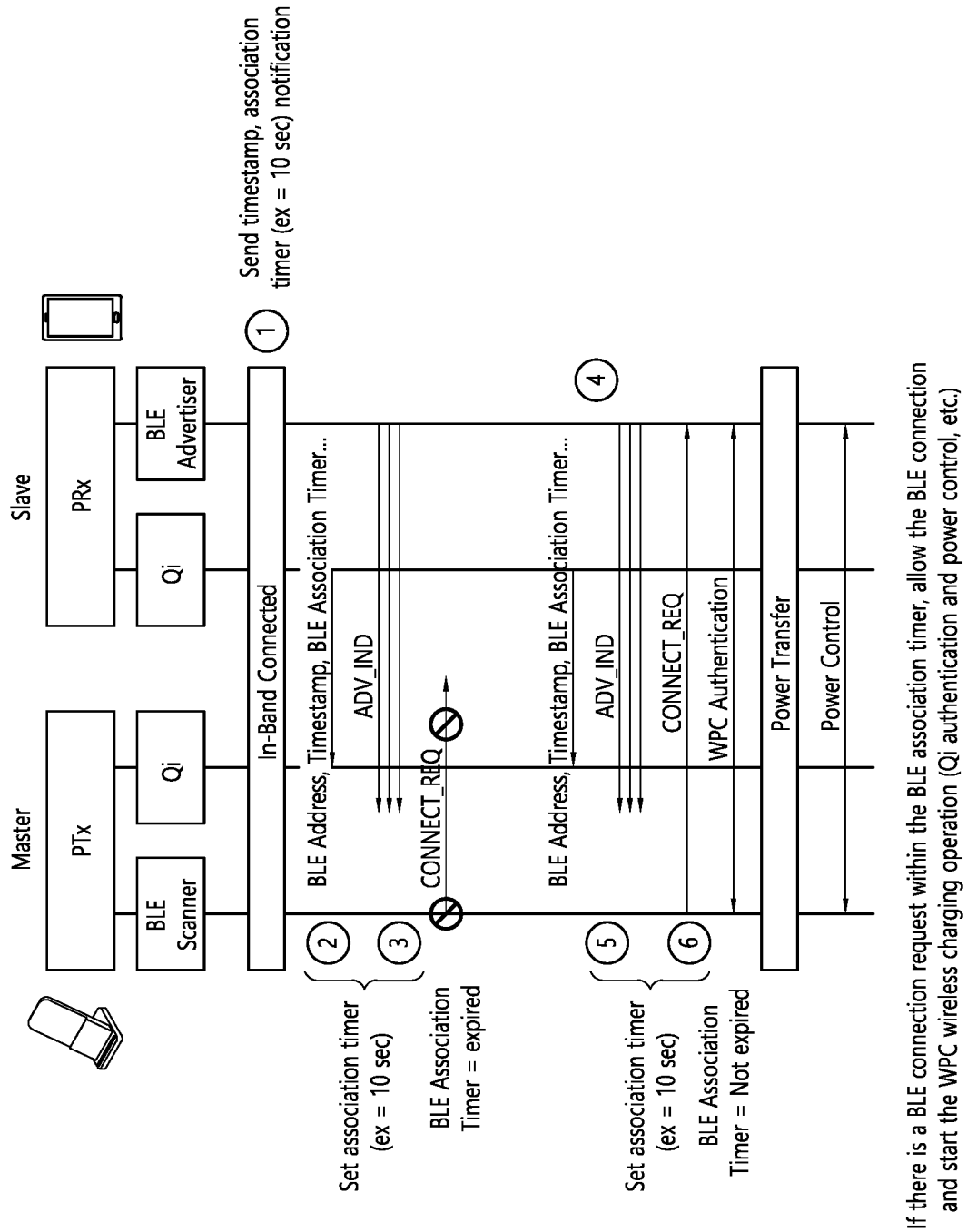
FIG. 29 illustrates another example of a BLE connection using a timer.

FIG. 29 illustrates another example of a BLE connection using a timer.

According to FIG. 29, a protocol for verifying an effective time from in-band to BLE connection by utilizing a BLE Association Timer (this description may be mixed with a BLE timer) may be provided.

As described above, in this figure, as an example, an example in which a value of a BLE related timer is provided from a wireless power receiver to a wireless power transmitter through in-band is described, but this is only an example of the present specification. That is, in the present specification, a wireless power transmitter that has not separately received a value of the BLE timer may drive the timer by a preset value to verify the effective time until the BLE connection.

An example in the present specification may be described for each step as follows.

Step 0 BLE-related timers can be utilized to prevent erroneous operation connected to a BLE-equipped device outside the WPC Qi charging range.

Steps 1 & 4: When the wireless power receiver and wireless power transmitter are connected in-band, at least one of information such as BLE address, timestamp, and BLE-related timer may be exchanged. For example, the wireless power transmitter may receive information about a BLE address and information about a BLE related timer from a wireless power receiver in this step (Of course, as described above, information on the BLE-related timer is not exchanged and may be set in advance in the wireless power transmitter).

Steps 2 & 5: The wireless power transmitter (or wireless power receiver) may set a timer (ex. 10 sec, which is smaller than the timeout (30 seconds) in the BLE security manager) related to BLE by using the information received in-band. At this time, the wireless power transmitter may attempt a BLE connection based on the BLE related timer together with the BLE address of the wireless power receiver it has received.

Step 3: If the wireless power receiver's BLE connection attempt is received after the BLE related timer expires, the connection request of the wireless power receiver can be ignored. That is, the wireless power transmitter may ignore a BLE connection attempt (eg, an advertisement packet (e.g. ADV_IND)) of the wireless power receiver received after the BLE related timer expires based on the expiration of the BLE related timer.

In addition, the wireless power transmitter may continue (or maintain) in-band communication based on ignoring the connection request from the wireless power receiver.

Step 6: If the wireless power receiver's BLE connection attempt is received before the BLE-related timer expires, the received connection request from the wireless power receiver may be allowed.

That is, when the wireless power transmitter receives a BLE connection attempt from the wireless power receiver before the BLE related timer expires, the wireless power transmitter may allow the BLE connection with the wireless power receiver and perform the BLE connection.

In other words, if there is a BLE connection request within the BLE related timer, the wireless power transmitter may allow the BLE connection and start a WPC wireless charging operation (Qi authentication and power control, etc.).

Hereinafter, embodiments of the present specification will be described again from various subject points of view.

The following drawings are made to explain a specific example of the present specification. Since the names of specific devices or names of specific signals/messages/fields described in the drawings are provided as examples, the technical features of the present specification are not limited to the specific names used in the drawings below.

Figure 30:
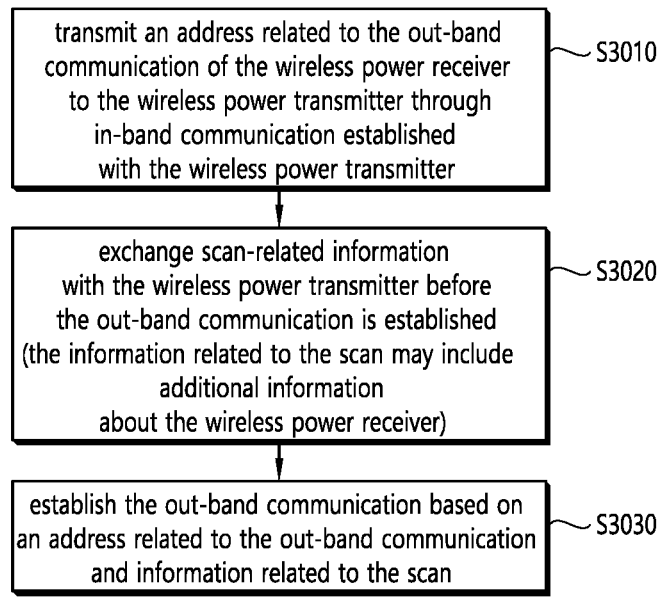
FIG. 30 is a flowchart of a method of transmitting an address related to out-band communication, performed by a wireless power receiver, according to an embodiment of the present specification.

FIG. 30 is a flowchart of a method of transmitting an address related to out-band communication, performed by a wireless power receiver, according to an embodiment of the present specification.

According to FIG. 30, the wireless power receiver may transmit an address related to the out-band communication of the wireless power receiver to the wireless power transmitter through in-band communication established with the wireless power transmitter (S3010).

The wireless power receiver may exchange scan-related information with the wireless power transmitter before the out-band communication is established (S3020).

The wireless power receiver may establish the out-band communication based on an address related to the out-band communication and information related to the scan (S3030).

Here, the information related to the scan may include additional information about the wireless power receiver. Here, a specific example for this is as described above.

Meanwhile, although not separately shown, the present specification may provide a wireless power receiver. The wireless power receiver may include a power pickup unit related to receiving wireless power from the wireless power transmitter and a communication/control unit related to communicating with the wireless power transmitter and controlling reception of the wireless power.

Here, the communication/control unit is configured to transmit an address related to out-band communication of the wireless power receiver to the wireless power transmitter through in-band communication established with the wireless power transmitter, is configured to exchange information related to a scan with the wireless power transmitter before the out-band communication is established, and is configured to establish the out-band communication based on an address related to the out-band communication and information related to the scan, where information related to the scan may include additional information about the wireless power receiver.

Figure 31:
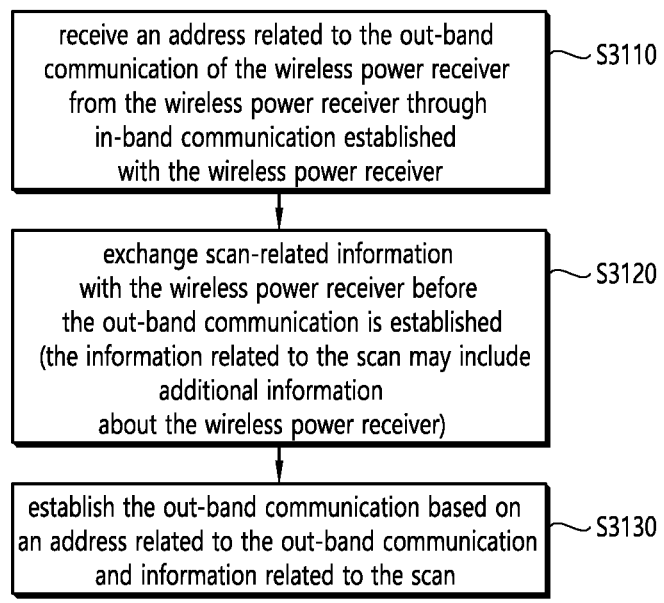
FIG. 31 is a flowchart of a method of receiving an address related to out-band communication, performed by a wireless power transmitter, according to an embodiment of the present specification.

FIG. 31 is a flowchart of a method of receiving an address related to out-band communication, performed by a wireless power transmitter, according to an embodiment of the present specification.

The wireless power transmitter may receive an address related to the out-band communication of the wireless power receiver from the wireless power receiver through in-band communication established with the wireless power receiver (S3110).

The wireless power transmitter may exchange scan-related information with the wireless power receiver before the out-band communication is established (S3120).

The wireless power transmitter may establish the out-band communication based on an address related to the out-band communication and information related to the scan (S3130).

Here, the information related to the scan may include additional information about the wireless power receiver. Here, a specific example for this is as described above.

Meanwhile, although not separately shown, the present specification may provide a wireless power transmitter. The wireless power transmitter may include a power conversion unit related to transmitting wireless power to the wireless power receiver and a communication/control unit related to communicating with the wireless power receiver and controlling transmission of the wireless power. The communication/control unit is configured to receive an address related to out-band communication of the wireless power receiver from the wireless power receiver through in-band communication established with the wireless power receiver, is configured to exchange information related to a scan with the wireless power receiver before the out-band communication is established, and is configured to establish the out-band communication based on an address related to the out-band communication and information related to the scan, where information related to the scan may include additional information about the wireless power receiver.

So far, the embodiments of the present specification have been described. In addition, according to the above-described embodiment, the following effects may occur.

First of all, as explained earlier, since the wireless power receiver transmits the BLE address to the wireless power transmitter through in-band, the wireless power transmitter can clearly know a BLE address (Here, the BLE address received through the in-band is named, for example, the first BLE address) related to a wireless power receiver located within its own wireless charging range (i.e., in-band communication established).

And, the wireless power transmitter checks whether the BLE address (The BLE address at this time is called the second BLE address) included in the advertisement packet (or it can be named information) received by the wireless power transmitter—e.g., ADV_IND—matches the first BLE address, as a result of the check, when the BLE addresses (i.e., the first BLE address and the second BLE address) match, a BLE connection with the wireless power receiver may be established.

Accordingly, since the wireless power transmitter can reliably establish a BLE connection with the wireless power receiver for which an in-band connection has been established, cross-connection issues can be prevented.

In addition to the above effect, in the present specification, since the wireless power transmitter can receive additional information of the wireless power receiver, it can be advantageous in terms of system expansion.

In particular, one of the advantages provided by the present specification is that the above additional information can be exchanged between the wireless power transmitter and the wireless transmission receiver through scan information (e.g., SCAN_REQ/RES).

For that reason, in the case of scan information (e.g., SCAN_REQ and/or SCAN_RES), since it is information exchanged between the wireless power transmitter and the wireless power receiver before the BLE connection is established in earnest, this is because the wireless power transmitter can obtain additional information of the wireless power receiver from the wireless power receiver without waiting for a long time to establish a BLE connection. That is, according to the present specification, there is an advantage that additional information of the wireless power receiver can be exchanged early between the wireless power transmitter and the wireless power receiver.

In addition to this, as in this specification, when a time stamp and/or BLE timer is provided, since the BLE connection can be performed only within the allowed time, there may be an advantage of strengthening communication security between the wireless power transmitter and the wireless power receiver.

For example, assume a case in which a third device can hack the BLE address of a wireless power receiver in a situation where a wireless power transmitter and a wireless power receiver exist. In this case, if the third device cannot hack the above BLE address within the valid time, even if a third device succeeds in hacking and attempts to access the wireless power transmitter, the wireless power transmitter may prevent a BLE connection attempt from a third device. Accordingly, there may be an effect that enhanced communication security between the wireless power transmitter and the wireless power receiver described above can be achieved.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method for transmitting an address packet in a wireless power transfer system, the method performed by a wireless power receiver and comprising:
   transmitting, to a wireless power transmitter through in-band communication, the address packet including first Bluetooth low energy (BLE) address of the wireless power receiver;
   transmitting, to the wireless power transmitter, an advertisement packet including a second BLE address which is identical to the first BLE address; and
   establishing a BLE connection with the wireless power transmitter within a specific time period from transmitting the advertisement packet.

2. The method of claim 1, wherein the in-band communication is communication based on a power signal of wireless power, and
   wherein the out-band communication is communication based on BLE.

3. The method of claim 1, wherein the method comprises:
   receiving scan request information from the wireless power transmitter,
   wherein the scan request information is information requesting additional information for the wireless power receiver; and
   transmitting scan response information to the wireless power transmitter in response to the scan request information,
   wherein the scan response information is the additional information for the wireless power receiver.

4. The method of claim 3, wherein the additional information includes at least one of information related to a random ID of the wireless power receiver, information related to a time stamp, or a message to which an integrity check for preventing forgery or tampering is added.

5. The method of claim 1, wherein when the BLE connection is not established within the specific time period, the wireless power receiver and the wireless power transmitter continue the in-band communication.

6. The method of claim 5, wherein, when the BLE connection is established within the specific time period, the wireless power receiver and the wireless power transmitter perform BLE communication which is established.

7. The method of claim 6, wherein whether the BLE communication is established within the specific time period is determined based on a timer.

8. A wireless power receiver comprising:
   a power pickup unit related to receiving wireless power from a wireless power transmitter; and
   a communication/control unit related to communicating with the wireless power transmitter and controlling reception of the wireless power,
   wherein the wireless power receiver is configured to:
   transmit, to a wireless power transmitter through in-band communication, the address packet including first Bluetooth low energy (BLE) address of the wireless power receiver;
   transmit, to the wireless power transmitter, an advertisement packet including a second BLE address which is identical to the first BLE address; and
   establish a BLE connection with the wireless power transmitter within a specific time period from transmitting the advertisement packet.

9. A method for receiving an address packet in a wireless power transfer system, the method performed by a wireless power transmitter and comprising:
   receiving, from a wireless power receiver through in-band communication, the address packet including first Bluetooth low energy (BLE) address of the wireless power receiver;
   receiving, from the wireless power receiver, an advertisement packet including a second BLE address which is identical to the first BLE address; and
   establishing a BLE connection with the wireless power receiver within a specific time period from receiving the advertisement packet.

10. The method of claim 9, wherein the in-band communication is communication based on a power signal of wireless power, and
    wherein the out-band communication is communication based on BLE.

11. The method of claim 9, wherein the method comprises:
    transmitting scan request information to the wireless power receiver, wherein the scan request information is information requesting additional information for the wireless power receiver; and receiving scan response information from the wireless power receiver in response to the scan request information, wherein the scan response information is the additional information for the wireless power receiver.

12. The method of claim 11, wherein the additional information includes at least one of information related to a random ID of the wireless power receiver, information related to a time stamp, or a message to which an integrity check for preventing forgery or tampering is added.

13. The method of claim 9, wherein when the BLE connection is not established within the specific time period, the wireless power receiver and the wireless power transmitter continue the in-band communication.

14. The method of claim 13, wherein, when the BLE connection is established within the specific time period, the wireless power receiver and the wireless power transmitter perform BLE communication which is established.

15. The method of claim 14, wherein whether the BLE communication is established within the specific time period is determined based on a timer.

* * * * *